US007213669B2

(12) United States Patent
Fecteau et al.

(10) Patent No.: US 7,213,669 B2
(45) Date of Patent: May 8, 2007

(54) SNOWMOBILE RIDER POSITIONING

(75) Inventors: Berthold Fecteau, Richmond (CA); Bruno Girouard, Montréal (CA)

(73) Assignee: Bombardier Recreational Products Inc., Valcourt (CA)

( * ) Notice: Subject to any disclaimer, the term of this patent is extended or adjusted under 35 U.S.C. 154(b) by 900 days.

(21) Appl. No.: 09/877,188

(22) Filed: Jun. 11, 2001

(65) Prior Publication Data
US 2003/0201129 A2 Oct. 30, 2003

Related U.S. Application Data

(63) Continuation-in-part of application No. 09/472,134, filed on Dec. 23, 1999.

(60) Provisional application No. 60/167,614, filed on Nov. 26, 1999.

(30) Foreign Application Priority Data
Dec. 23, 1998 (CA) .................................. 2256944

(51) Int. Cl.
*B62M 27/02* (2006.01)
*B62M 29/00* (2006.01)

(52) U.S. Cl. ..................................... 180/184; 180/190

(58) Field of Classification Search ................ 180/182, 180/184, 186, 190
See application file for complete search history.

(56) References Cited

U.S. PATENT DOCUMENTS

| | | | |
|---|---|---|---|
| 3,583,506 A | 6/1971 | Preble | |
| 3,583,507 A | 6/1971 | Trautwein | |
| 3,622,196 A | 11/1971 | Sarra | |
| 3,627,073 A | 12/1971 | Grimm | |
| 3,734,219 A * | 5/1973 | Christensen et al. | ........ 180/190 |
| 3,981,373 A | 9/1976 | Irvine | |
| 4,204,581 A | 5/1980 | Husted | |

(Continued)

FOREIGN PATENT DOCUMENTS

CA 2251769 8/1995

(Continued)

OTHER PUBLICATIONS

Magazine Article: Dirt Wheels/Jan. 1991.

(Continued)

*Primary Examiner*—Lesley D. Morris
(74) *Attorney, Agent, or Firm*—Osler, Hoskin & Harcourt LLP

(57) ABSTRACT

A snowmobile positions riders close to the center of gravity of the snowmobile, reduces jostling forces, and improves the comfort and ridability of the snowmobile. The snowmobile has a steering position on a steering device that is disposed forward of the forward-most drive axle and center of gravity of the snowmobile. A steering shaft, which operatively connects the steering device to the skis, forms an angle of less than 45 degrees with vertical. The seat may have seat positions for one, two, or three riders, the first seat position being disposed less than 590 mm behind the forward-most drive track axle. The seat may be divided into two sections, the second seat section being removably attached to the frame behind the first seat section. The back of the seat and the rearward-most seat position may be disposed behind the back end of the snowmobile's frame.

127 Claims, 12 Drawing Sheets

U.S. PATENT DOCUMENTS

| | | | |
|---|---|---|---|
| 4,204,582 A | | 5/1980 | Van Soest |
| 4,502,560 A | | 3/1985 | Hisatomi |
| 4,613,006 A | | 9/1986 | Moss et al. |
| 4,633,964 A | | 1/1987 | Boyer et al. |
| 4,699,229 A | | 10/1987 | Hirose et al. |
| 4,804,198 A | * | 2/1989 | Imai et al. .................. 280/21.1 |
| 4,848,503 A | | 7/1989 | Yasui et al. |
| 5,370,198 A | | 12/1994 | Karpik |
| 5,474,146 A | | 12/1995 | Yoshioka et al. |
| 5,564,517 A | | 10/1996 | Levasseur |
| 5,660,245 A | | 8/1997 | Marier et al. |
| 5,944,133 A | | 8/1999 | Eto |
| 5,944,380 A | * | 8/1999 | Atherley .................. 297/195.1 |
| 6,086,149 A | * | 7/2000 | Atherley .................. 297/195.1 |
| 6,234,263 B1 | | 5/2001 | Boivin et al. |
| 2002/0017765 A1 | * | 2/2002 | Mallette et al. ............. 180/182 |
| 2002/0020573 A1 | * | 2/2002 | Fournier et al. ............ 180/182 |

FOREIGN PATENT DOCUMENTS

| | | |
|---|---|---|
| JP | 2-274681 | 11/1990 |

OTHER PUBLICATIONS

Brochure of Yamaha Snow Scout: Motoneige Quebec, 1987, vol. 13, No. 1 (CA).
Brochure of Yamaha Snow Scout: Snowmobile Brochure Business, $3^{rd}$ Annual.
Magazine Supertrax/Jan. 1999.
Snow tech, Spring 1999, Article "Special Report" Redline Snowmobiles, pp. 28-31.
Montoneige Quebec, vol. 25-No. 3, Nov. 1999, pp. 1 (front cover), 6, 31 and 58.
Creations J.P.L. Inc. Advertisement (advertising seat designs).

* cited by examiner

FIG. 8

| | | | Convention | | VEHICLE INVENTION | | | | | |
|---|---|---|---|---|---|---|---|---|---|---|
| | Distance (mm) | | | | 1st Embodiment 2-up Long (FIG. 2) | 2nd Embodiment 2-up Long (FIG. 3) | 3rd Embodiment 1+1 Short (FIG. 4A) | 4th Embodiment 3-up Long (FIG. 5) | 5th Embodiment 2+1 Long (FIG. 6A) | 6th Embodiment 1-up Long (FIG. 7) |
| ref.# | from: | to (going back): | Long | Short | | | | | | |
| A | foward axle | CG(vehicle) | 110 | 30 | 65 | 95 | 95 | 95 | 170 | 170 | 95 |
| B | steering pos. | CG(vehicle) | -160 | -240 | 130 | 160 | 160 | 160 | 235 | 235 | 160 |
| C | CG(vehicle) | CG(rider 1) | 645 | 725 | 350 | 320 | 320 | 320 | 245 | 245 | 320 |
| D | CG(vehicle) | seat pos(1) | 795 | 875 | 500 | 470 | 470 | 470 | 395 | 395 | 470 |
| E | CG(rider 1) | CG(rider 2) | 370 | 370 | 370 | 370 | 370 | 370 | 370 | 370 | N/A |
| F | seat pos(1) | seat pos(2) | 340 | 340 | 340 | 340 | 340 | 340 | 340 | 290 | N/A |
| G | CG(rider 2) | CG(rider 3) | N/A | N/A | N/A | N/A | N/A | N/A | 310 | 345 | N/A |
| H | seat pos(2) | seat pos(3) | N/A | N/A | N/A | N/A | N/A | N/A | 310 | 345 | N/A |
| I | CG(vehicle) | CG(V+1 rider) | 180 | 160 | 70 | 50 | 50 | 50 | 60 | 70 | 50 |
| J | CG(vehicle) | CG(V+2 riders) | 290 | 280 | 175 | 190 | 190 | 190 | 170 | 170 | N/A |
| K | CG(vehicle) | CG(V+3 riders) | N/A | N/A | N/A | N/A | N/A | N/A | 300 | 300 | N/A |
| L | steer pos. | rear steer pos. | 975 | 975 | 970 | 970 | 970 | 970 | 1280 | 1265 | N/A |
| M | back of frame | back of seat | -50 | 0 | 100 | -100 | -100 | 230 | 60 | 290 | -110 |
| N | back of frame | rear steer pos. | -290 | -120 | -130 | -340 | -340 | 80 | -200 | 60 | -260 |
| | Angles (Degrees) | | | | | | | | | |
| | epsilon vert. and steering shaft | | >=45 | >=45 | ALL < 45, preferably 25-40, more preferably 30-35, most preferably 33 | | | | | | |

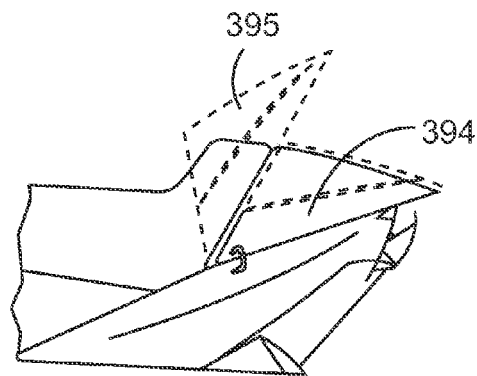 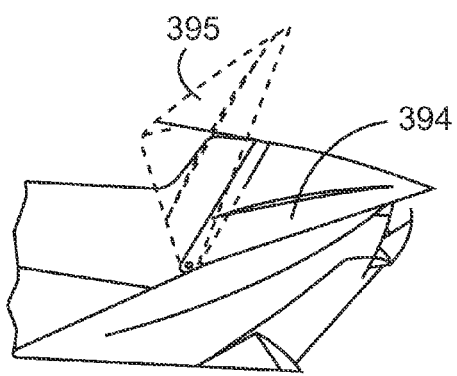
FIG. 11A  FIG. 11B
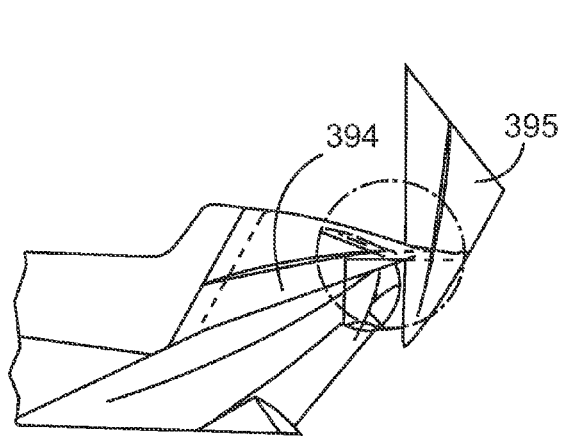 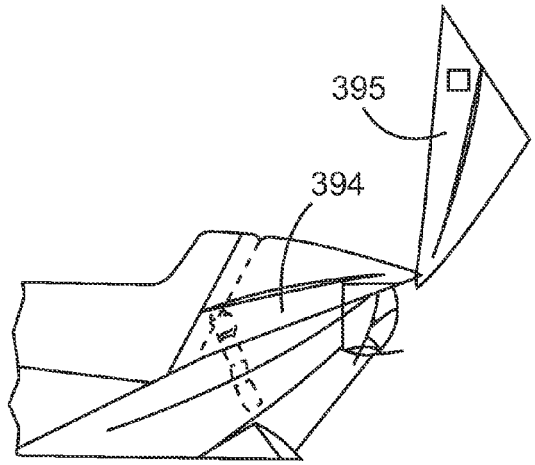
FIG. 11C  FIG. 11D

SNOWMOBILE RIDER POSITIONING

This application is a continuation-in-part of U.S. patent application Ser. No. 09/472,134, filed on Dec. 23, 1999, which is incorporated herein by reference. Through U.S. patent application Ser. No. 09/472,134, this application claims the benefit of U.S. Provisional Patent Application No. 60/167,614, filed on Nov. 26, 1999, which is incorporated herein by reference. This application also claims the benefit of priority to Canadian Patent Application No. 2,256,944, filed on Dec. 23, 1998, which is incorporated herein by reference.

BACKGROUND OF THE INVENTION

1. Field of the Invention

The present invention relates generally to the overall design and construction of a snowmobile, and more particularly to a design of a snowmobile that improves the driver's control over the snowmobile and the riders' comfort.

2. Description of the Related Art

Conventional snowmobiles 110 (FIG. 1) share a common construction: they combine features and elements so that the rider (driver) 26 sits in a generally upright position in a location toward the rear of the snowmobile 110. When seated in this fashion, the rider 26 sits a considerable distance behind the center of gravity 146 of the snowmobile 110, which is located at or in proximity to the axis of the forward-most axle 144 of the drive track 120.

When the snowmobile 110 encounters a bump as it travels over the ground, it naturally tends to pivot about its center of gravity 146. Accordingly, the further the rider 26 is positioned from the center of gravity 146 of the snowmobile 110, the more strongly the rider 26 will feel each bump. This occurs because the snowmobile 110 acts as a lever that amplifies the magnitude of the forces transferred from bumps on the ground to the rider 26.

As illustrated in FIG. 1, the positions of the handlebars, seat, and footrests of a conventional snowmobile 110 relative to its center of gravity 146 place the driver 26 far behind the center of gravity 146 of the snowmobile 110. Consequently, the rider 26 experiences significant forces as the snowmobile 110 traverses each bump. When a second rider (passenger) 28 sits on the snowmobile 110 behind the driver 26 in a second seat (2-up rider positioning), the passenger 28 is positioned even farther away from the snowmobile's center of gravity 146 and experiences even more uncomfortable jostling when the snowmobile 110 encounters a bump.

While it would be desirable to add a third seat to accommodate a second passenger (third rider), it has not been done because the riders are positioned so far back on the conventional snowmobile 110, that a third rider, who would be positioned even farther rearward on a third seat, would experience prohibitively large jostling forces.

Accordingly, while the positioning of the driver and passenger on the conventional snowmobile is entirely adequate for enjoying the sport of snowmobiling, a need has arisen for a snowmobile where the driver's and passenger's positions are improved to minimize the effect on the riders of the snowmobile's movement over uneven terrain.

In addition, a desire has developed for a snowmobile that may comfortably accommodate two passengers in addition to the driver (3-up rider positioning).

SUMMARY OF THE INVENTION

The present invention improves upon the conventional design by repositioning the riders on the snowmobile and redesigning the layout of the snowmobile to minimize the effect of the snowmobile's movement on the driver and passenger(s) as they pass over uneven terrain. This improvement facilitates the addition of a third seat for a third rider, who experiences a reasonably comfortable ride.

As would be understood by a person skilled in the art, a snowmobile has a center of gravity without the rider. It should be understood that in the context of the present invention it is assumed that the snowmobile is in running condition and is full of fuel.

In one aspect of the present invention, a snowmobile is provided with a frame, a seat disposed on the frame, first and second seat positions defined by the seat, an engine disposed on the frame in front of the seat, a drive track disposed below the frame and connected operatively to the engine for propulsion of the snowmobile, a forward-most drive track axle disposed on the frame, two skis disposed on the frame, a steering device having a steering position, and a steering shaft operatively connecting the two skis to the steering device for steering the snowmobile. The steering shaft is disposed over the engine at an angle $\epsilon$ of less than 45° from vertical. The first seat position is disposed less than 590 mm behind the forward-most drive track axle. The second seat position is disposed behind the first seat position by between 315 mm and 365 mm.

The snowmobile may also include a third seat position disposed behind the second seat position by between 285 mm and 370 mm.

The seat may comprise first and second seat sections. The second seat section is removable and a cargo space may be provided below the second seat section.

According to another aspect of the present invention, a snowmobile is provided having a frame, a seat disposed on the frame, first and second seat positions defined by the seat, an engine disposed on the frame in front of the seat, a drive track disposed below the frame and connected operatively to the engine for propulsion of the snowmobile, a forward-most drive track axle disposed on the frame, two skis disposed on the frame, a steering device having a steering position, and a steering shaft operatively connecting the two skis to the steering device for steering the snowmobile. The steering position is disposed forward of the forward-most drive track axle. The first seat position is disposed less than 590 mm behind the forward-most drive track axle. The second seat position is disposed behind the first seat position by between 315 mm and 365 mm.

According to yet another aspect of the present invention, a snowmobile is provided having a frame, an engine disposed on the frame, a drive track disposed below the tunnel and connected operatively to the engine for propulsion of the snowmobile, two skis disposed on the frame, a steering device disposed on the frame and operatively connected to the two skis for steering the snowmobile, and a seat disposed on the frame such that a back end of the seat extends behind a rearward-most portion of the frame.

According to yet another aspect of the present invention, a snowmobile is provided having a frame, an engine disposed on the frame, a drive track disposed below the tunnel and connected operatively to the engine for propulsion of the snowmobile, two skis disposed on the frame, a steering device disposed on the frame and operatively connected to the two skis for steering the snowmobile, and a seat disposed on the frame such that a seat position defined by the seat is disposed behind a rearward-most portion of the frame.

In still another aspect of the present invention, a snowmobile is provided with a frame, a seat disposed on the frame, a seat position defined by the seat, an engine disposed on the frame in front of the seat, a drive track disposed below the frame and connected operatively to the engine for propulsion of the snowmobile, a forward-most drive track axle disposed on the frame, two skis disposed on the frame, a steering device having a steering position, and a steering shaft operatively connecting the two skis to the steering device for steering the snowmobile. The steering shaft is disposed over the engine at an angle $\epsilon$ of less than 45° from vertical. The first seat position is disposed less than 590 mm behind the forward-most drive track axle.

Other aspects of the present invention will be made more apparent in the description that follows.

BRIEF DESCRIPTION OF THE DRAWINGS

Various exemplary embodiments of the present invention will be described with reference to the following drawings, wherein like reference numbers denote like features, in which:

FIG. 8 is a table comparing various dimensions of conventional snowmobiles and snowmobiles according to the present invention;

FIGS. 11A through 11D show the operation of a cover according to either the third or fifth embodiment.

DESCRIPTION OF EXEMPLARY EMBODIMENTS

Figure 1:
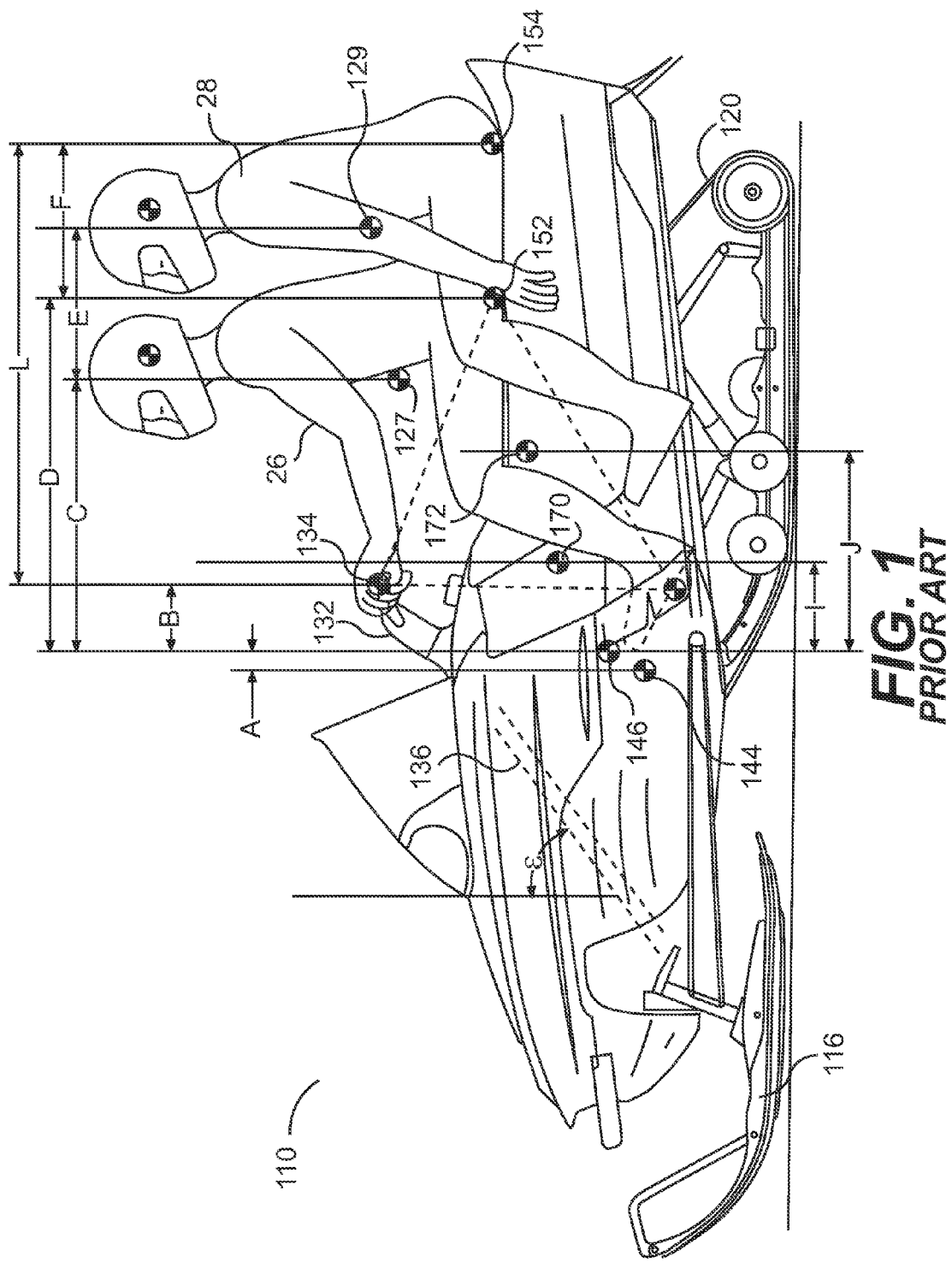
FIG. 1 is a side view illustration of a conventional snowmobile.

Throughout the description of the various embodiments of the present invention, reference will be made to various elements, the construction of which is readily known to those skilled in the art. Accordingly, an exhaustive description of each and every component is not provided. Components that are similar to components in other embodiments will be referenced by identical reference characters but with different prefix digits.

The inventors of the present invention realized that it is possible to improve the construction of a snowmobile to alter the positioning of the riders to considerably improve the handling and ride of the snowmobile. By shifting the steering device of the snowmobile forward, the centers of gravity of the riders are likewise shifted forward and closer to the center of gravity of the snowmobile. As a result, the riders experience significantly less jostling when the snowmobile encounters uneven terrain. Moreover, the driver is able to maintain better control over the snowmobile.

In addition, by moving the positioning of the first and second riders forward, the inventors of the present invention have been able to add a third seat for a third rider behind the second rider, while avoiding the prohibitively large forces that a third rider would have experienced on a conventional snowmobile.

FIG. 8 compares various dimensions of the embodiments of the present invention and conventional snowmobiles 110. Reference characters A–N and $\epsilon$ represent variables and are commonly defined herein. With respect to distances, the positive direction is backward relative to the direction of travel of the snowmobile. Horizontal distances are measured when the unloaded (riderless) snowmobile is positioned on level ground. Some of the dimensions will not apply to all of the embodiments. See FIGS. 1, 2, 3, 4A and 7.

Distance A is measured horizontally from the axis of the forward-most drive axle to the center of gravity of the unloaded snowmobile. Distance B is measured horizontally from the steering position to the center of gravity of the unloaded snowmobile. Distance C is measured horizontally from the center of gravity of the unloaded snowmobile to the center of gravity of a first rider (driver). Distance D is measured horizontally from the center of gravity of the unloaded snowmobile to a seat position of the first rider (driver). Distance E is measured horizontally from the center of gravity of the first rider to a center of gravity of a second rider. Distance F is measured horizontally from the seat position of the first rider (driver) to a seat position of a second rider (first passenger). Distance G is measured horizontally from the center of gravity of the second rider to the center of gravity of a third rider (second passenger). Distance H is measured horizontally from the second seat position to a third seat position. Distance I is measured horizontally from the center of gravity of the unloaded snowmobile to a combined center of gravity of the snowmobile and first rider. Distance J is measured horizontally from the center of gravity of the unloaded snowmobile to a combined center of gravity of the snowmobile, first rider, and second rider. Distance K is measured horizontally from the center of gravity of the unloaded snowmobile to the combined center of gravity of the snowmobile and first through third riders. Distance L is measured horizontally from the steering position to a rearward-most seat position. Distance M is measured horizontally from the back end of the frame of the snowmobile to the back end of the second seat section. Distance N is measured horizontally from the back end of the frame of the snowmobile to the rear-most seat position. Angle $\epsilon$ is measured between vertical and an angular position of a steering shaft of the snowmobile. Lengths A–N are measured in millimeters. While FIG. 8 discloses the most preferred dimensions for each embodiment, the range of lengths for each dimension according to the present invention shall be understood to be preferably within 25 mm of the stated dimension, more preferably within 15 mm of the dimension, and even more preferably within 5 mm of the dimension.

To facilitate comparison of the present invention to the conventional snowmobiles 110 in FIG. 8, several additional aspects of the conventional snowmobile 110 must be identified. As shown in FIG. 1, the steering shaft 136 operatively connects the steering device 132 to the skis 116. The steering device 132 has a steering position 134, which is defined in the same manner as in the below embodiments. The driver (first rider) 26 has a center of gravity 127, which is located slightly forward of his torso because his arms and legs extend forward of his body while riding the snowmobile 10, and sits in a seat position 152. Similarly, the first passenger (second rider) 28 has a center of gravity 129, and sits in a seat position 154. A combined center of gravity 170 of the snowmobile 110 and the first rider 26 is located behind the center of gravity 146 of the snowmobile 110 without riders. A combined center of gravity 172 of the snowmobile 110 and first and second riders 26, 28 is located farther behind the center of gravity 146 of the snowmobile 110 without any riders.

Figure 2:
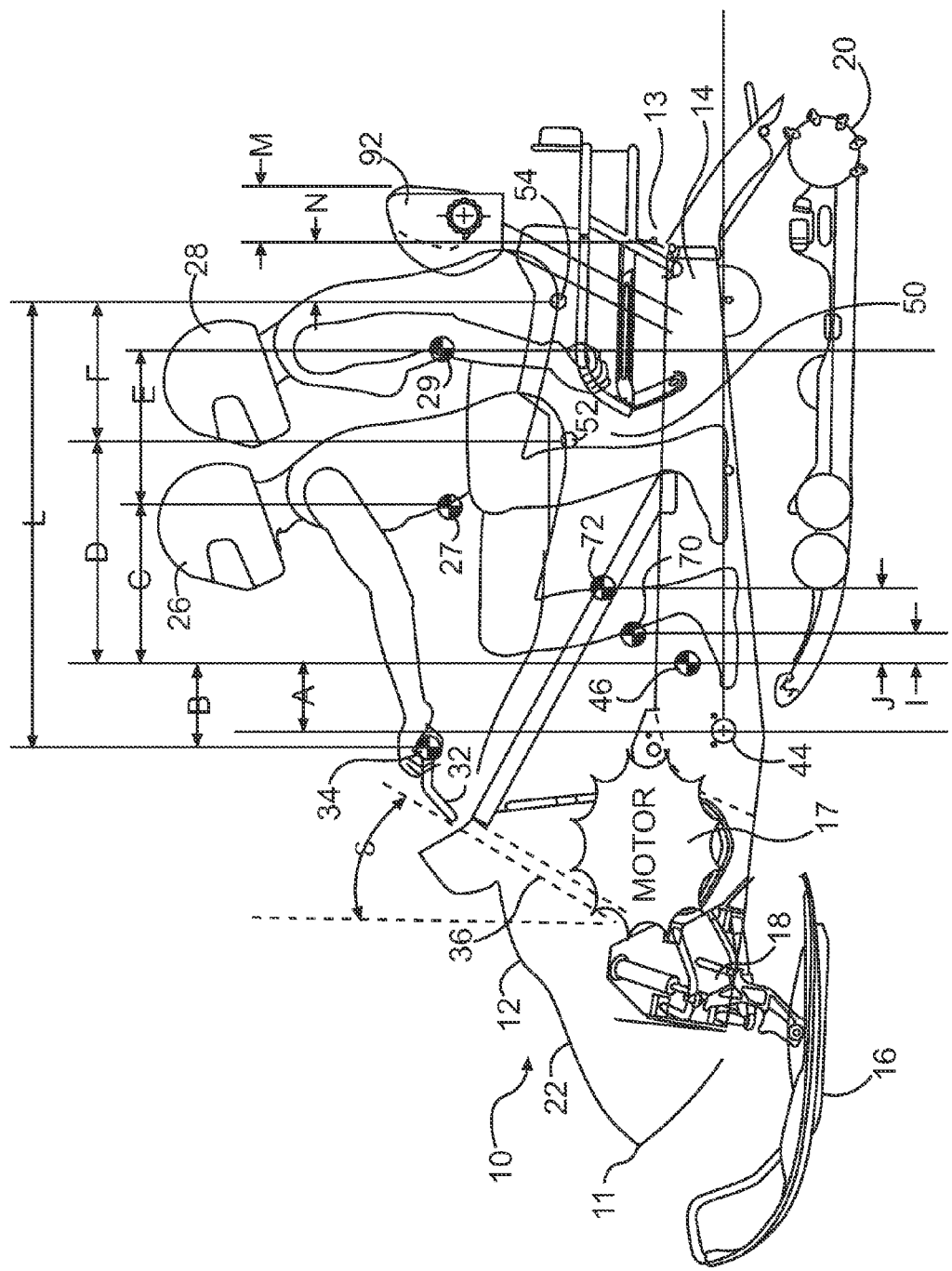
FIG. 2 is a side view illustration of a snowmobile according to a first embodiment of the present invention.

FIG. 2 illustrates a first embodiment of the snowmobile 10. The snowmobile 10 has a forward end 11 and a rearward end 13 that are defined consistently with the travel direction of the snowmobile 10. The snowmobile 10 includes a body 12 (i.e., the exterior upper portions) and a frame 14. A motor 17, such as an internal combustion engine, is carried by the frame 14 at the forward end 11. In addition, two skis 16 are attached to the forward end 11 of the frame 14 through a suspension system 18. It should be noted, however, that a single centered ski would also work with the invention. A drive track 20 is disposed under frame 14 and is connected operatively to the engine 17 for propulsion of the snowmobile 10.

At the front 11 of the frame 14, the snowmobile 10 includes fairings 22 that enclose the engine 17 to protect it and to provide an external shell that can be decorated so that the snowmobile 10 is aesthetically pleasing. Typically, the fairings 22 comprise a hood and a bottom pad (neither of which have been individually identified in the drawing figures). A windshield (not shown) may be connected to fairings 22 near the forward end 11 of snowmobile 10 in front of a steering device 32 to lessen the force of the air on the first rider (driver) 26 when the snowmobile 10 is moving.

A straddle-type seat 50 is disposed on the frame 14 behind the engine 17. The seat 50 has a first seat position 52, which is defined as a portion of the seat 50 that is adapted to support a center of a weight distribution of the first rider 26 on the seat 50. Because snowmobiles typically have elongated straddle seats and are adapted to permit riders to sit in a variety of front-back positions, numerous seat positions will exist on any straddle seat. The inventors of the present invention define the term "seat position" to point out particular positions on the snowmobile that are adapted to function as the seat position for a standard rider.

Figures 9A, 9B:
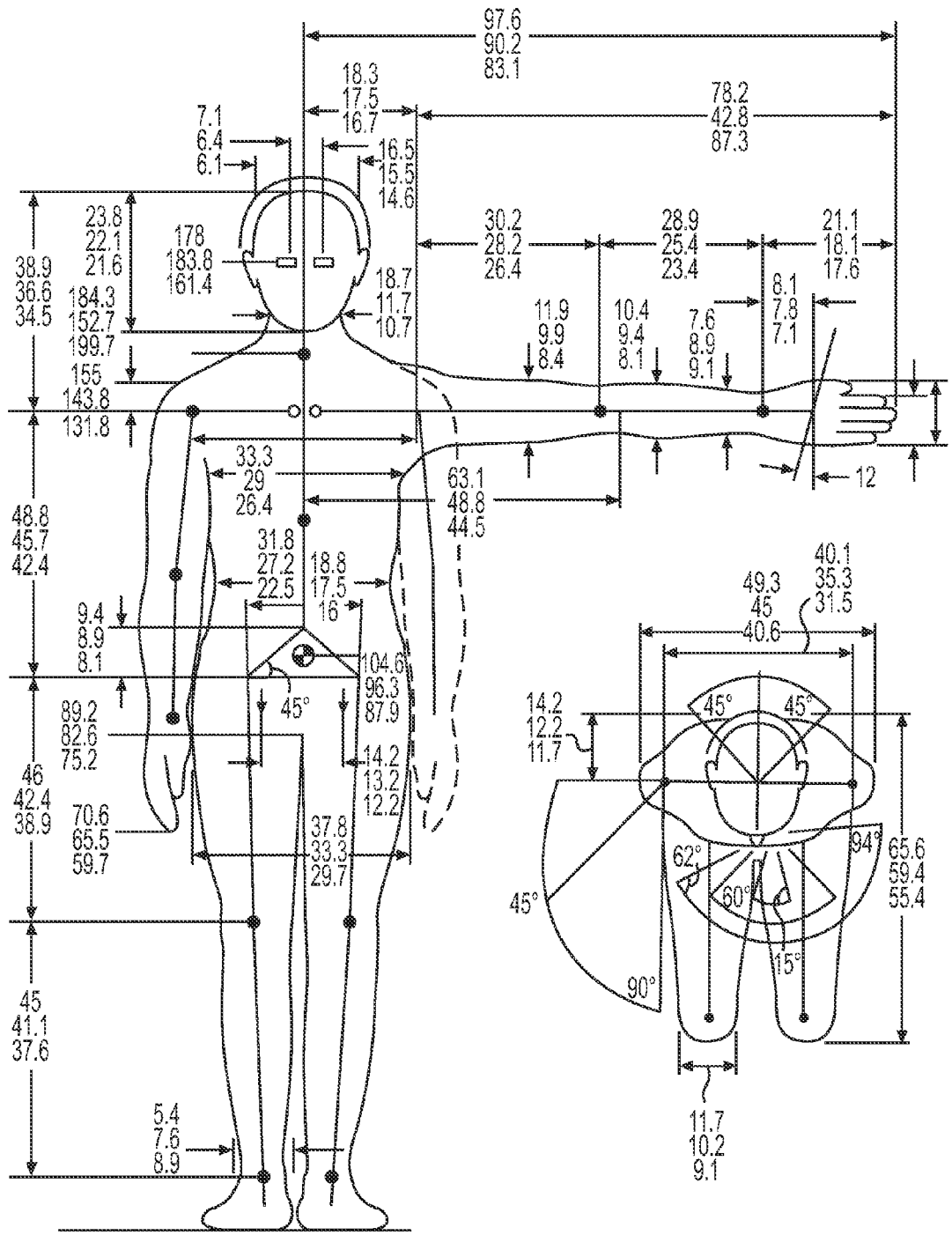
FIGS. 9A, 9B and 10 show the dimensions of a standard rider.
Figure 10:
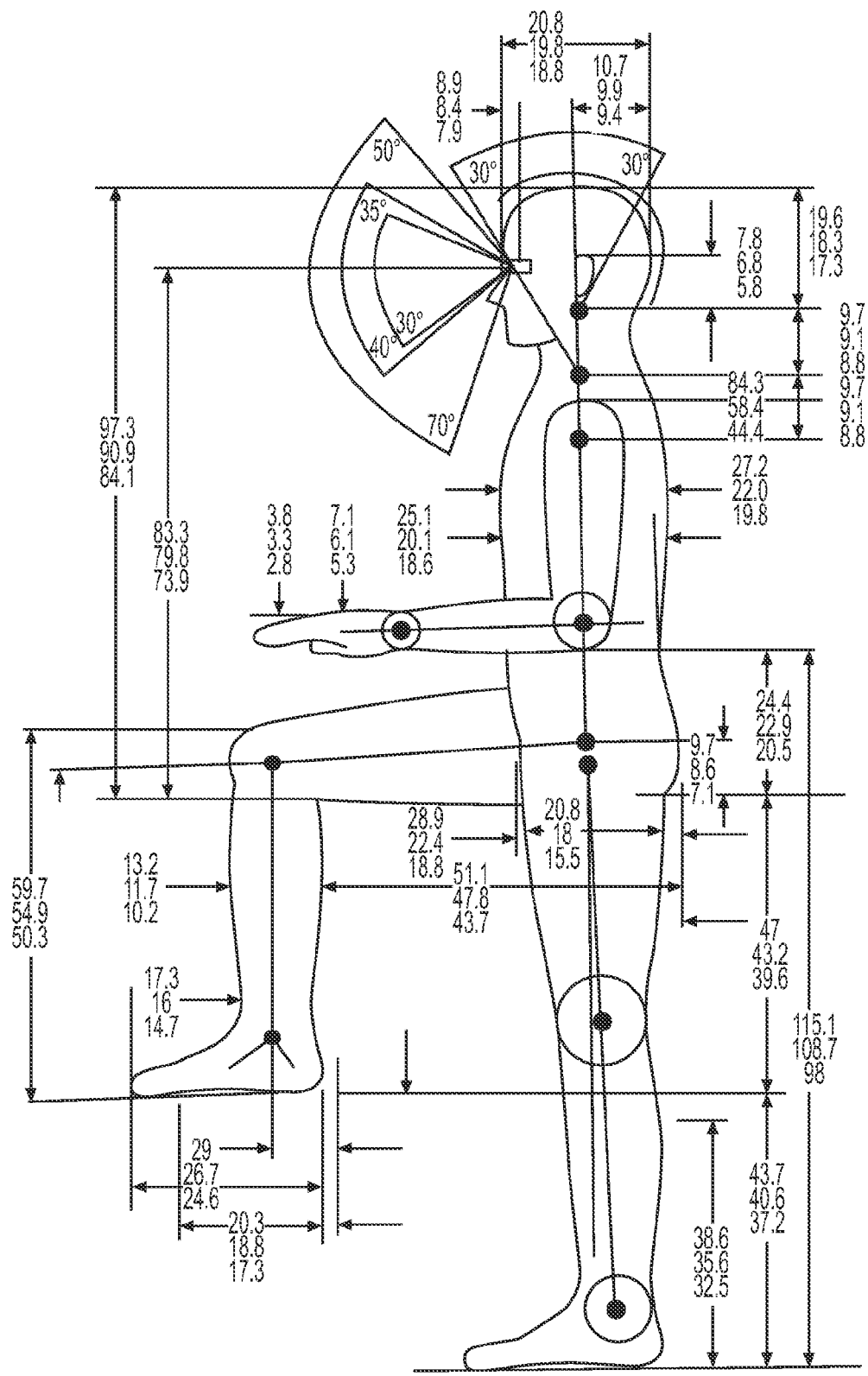
Figure 12C:
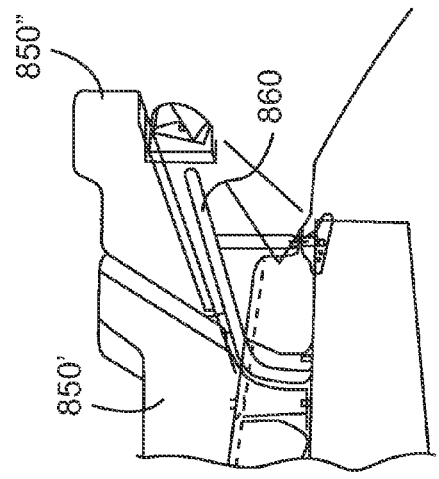
FIGS. 12A through 12E show alternative seat and support arrangements for either the third or fifth embodiment.
Figure 12B:
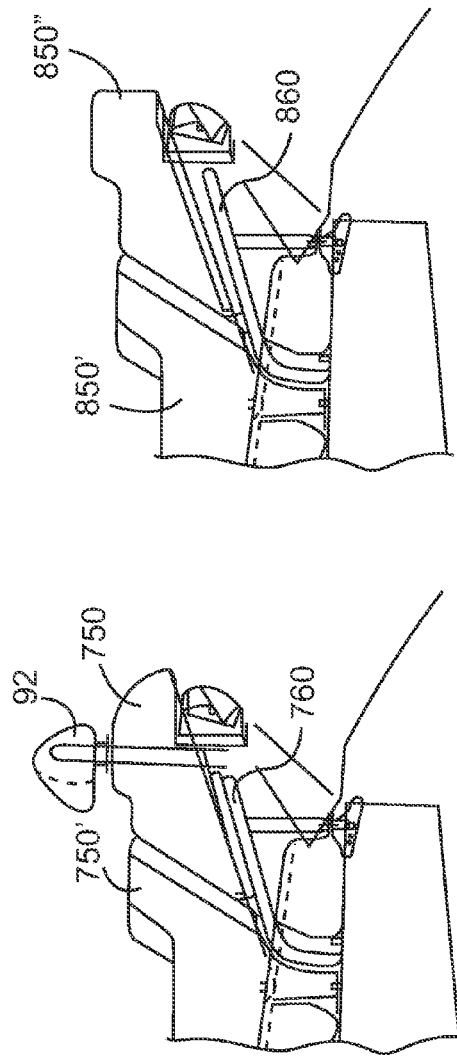
Figure 12A:
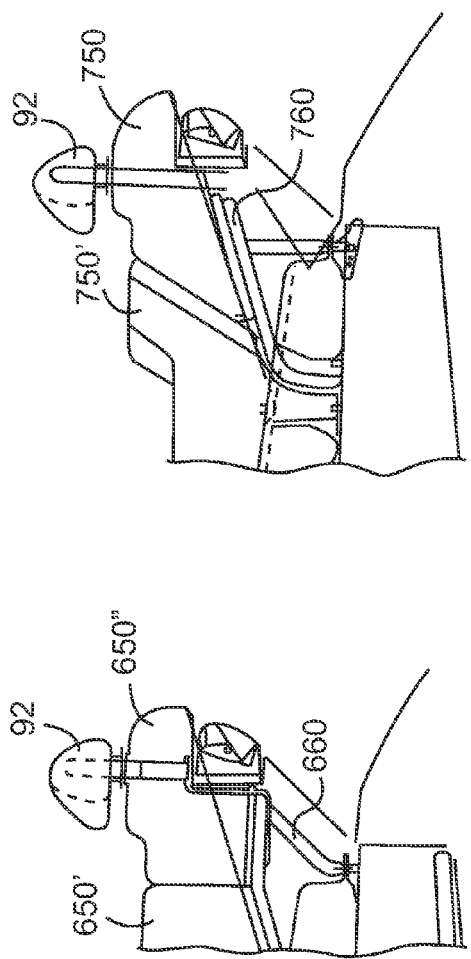
Figure 12E:
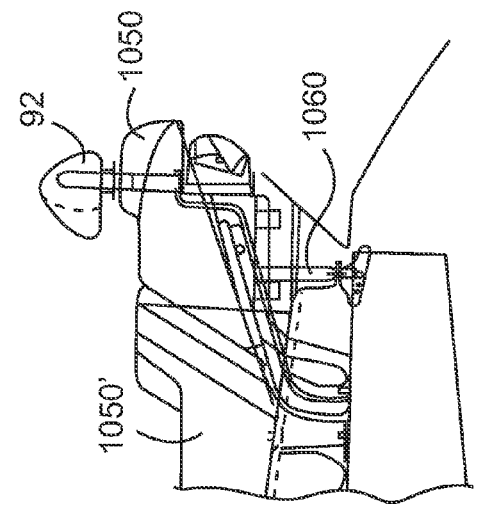
Figure 12D:
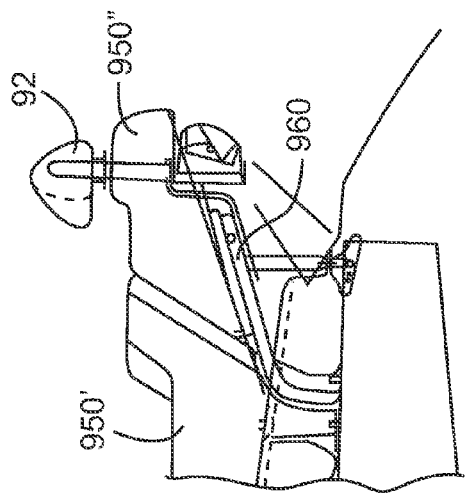

FIGS. 9A, 9B and 10 illustrate the various dimensions of a standard rider of the type depicted throughout the drawings. The standard rider is a $50^{th}$ percentile North-American adult male. All lengths in FIGS. 9A, 9B and 10 are in centimeters. The middle of each set of three dimensions represents the standard rider. The standard rider weighs 78 kgs. and has the body build illustrated in FIGS. 9A, 9B and 10. The dimensions of the standard rider are a "ruler" by which the dimensions of the various embodiments of the snowmobile of the present invention are measured. Riders 26, 28, 30 are standard riders.

The steering device 32, such as a handlebar, is positioned at the forward end of the snowmobile 10 above the engine 17. The steering device 32 has a steering position 34, which is defined by a center of a portion of the steering device adapted to be held by the hands of the rider 26. The steering position 34 is defined when the skis 16 are positioned straight-forward. For example, if the steering device 32 comprises handlebars (as illustrated in FIG. 2), the steering position 34 is the center of the grips of the handlebars.

While the steering device 32 is shown in the various figures as a handlebar, the steering device 32 should not be limited to just this particular construction. It would be understood by those skilled in the art that any suitable steering device 32 may be used for the snowmobile 10. For example, the steering device 32 could be a steering wheel or a yoke of the type used in aircraft. In accordance with the above definition of the steering position 34, if the steering device 32 is a steering wheel or yoke, the steering position 34 is the center of the steering wheel or yoke.

Moreover, the positioning of the steering device 32 above the engine 17 also should not be considered to be limited to the position illustrated in FIG. 2. As would be understood by those skilled in the art, depending on the particular arrangement of elements for the snowmobile 10, it is possible that the steering device 32 could be positioned higher or lower than shown in FIG. 2 without departing from the scope and spirit of the present invention.

A steering shaft 36 operatively connects the steering device 32 to the two skis 16 and is disposed over the engine 17 at an angle $\epsilon$ from vertical. The inventors altered the positioning of the axis of the steering shaft 36 so that it is more steeply sloped than steering shafts 136 in prior art snowmobiles 110 having steering shafts over the engine. According to the present invention, and as illustrated in FIGS. 2 and 8, the angle $\epsilon$ is less than 45°. More preferably, angle $\epsilon$ lies between about 25 and 40°. Even more preferably, angle $\epsilon$ lies between about 30 and 35°. Most preferably, angle $\epsilon$ is about 33°.

There are several reasons to have a small angle $\epsilon$. For example, the small angle $\epsilon$ is preferred because it facilitates placement of the steering position 34 in a position forward of that for the conventional snowmobile 110. The forward position of the steering position 34 moves the riders' 26, 28 positions closer to the center of gravity 46 of the snowmobile 10 and improves the comfort of riders 26, 28. Additionally, the turning force applied by the rider 26 is more directly applied to steer the snowmobile 10 when angle $\epsilon$ is small.

Because the steering device 32 is shifted forward, relative to the conventional snowmobile 110, the steering position 34 is disposed in front of the center of gravity 46 by a distance B. According to the first embodiment of the present invention shown in FIG. 2, distance B is greater than 0 and preferably between 105 mm and 155 mm. More preferably, distance B is between 115 mm and 145 mm. Even more preferably, distance B is between 125 mm and 135 mm. Most preferably, distance B is about 130 mm. In contrast, the steering position 134 of the conventional snowmobile 110 is behind the center of gravity 146 of the snowmobile (see FIGS. 1 and 8) such that distance B for conventional snowmobiles are −160 mm for long frames and −240 mm for short frames. Long and short frames will be described later.

A drive track 20, which is operatively connected to the engine 17, is positioned below the frame 14. The drive track 20 is a continuous belt that runs around a number of axles including a forward-most axle 44. The continuous belt has a 136 inch circumference in the first embodiment illustrated in FIG. 2, though the invention is in no way limited to a snowmobile with a particular belt size. The forward-most drive axle 44 is disposed behind the steering position 34 by a distance calculated as distance B minus distance A. According to the present invention, the forward-most drive axle 44 is disposed behind the steering position 34. Preferably, the distance is between 40 mm and 90 mm. More preferably, the distance is between 50 mm and 80 mm. Even more preferably, the distance is between 60 mm and 70 mm. Most preferably, the distance is about 65 mm. In contrast, the steering positions 134 on conventional snowmobiles are positioned behind the forward-most drive 144 axle by 270 mm (see FIGS. 1 and 8).

Two footrests are positioned on either side of seat 50 to accommodate the feet of the riders 26, 28. The footrests extend outwardly from the frame 14. The footrests may be disposed in a horizontal orientation, or alternatively, in an angled orientation.

An adjustable backrest 92 is attached to the seat 50 near the back end of the seat 50. Various embodiments of the backrest 92 are described throughout the specification, where preferred. As would be understood by those skilled in the art, the backrest 92 need not have only the construction shown or be located in the position depicted. In fact, the backrest 92 need not be provided at all.

The first seat position 52 is located behind the forward-most drive axle 44 by a horizontal distance calculated as distance D plus distance A. According to the present invention, this distance is less than 590 mm and preferably between 540 mm and 590 mm. More preferably, this distance is between 550 mm and 580 mm. Even more preferably, this distance is between 560 mm and 570 mm. Most preferably, this distance is about 565 mm. In contrast, the first seat position 152 in conventional snowmobiles 110 is a much larger 905 mm behind the forward-most drive axle 144 (see FIGS. 1 and 8).

A second seat position 54 is disposed on the seat 50 behind the first seat position 52 and is adapted to accommodate a second rider 28 (first passenger) behind the driver 26 (first rider). As the rider 26 is positioned closer to the center of gravity 46 of the snowmobile 10 than on a conventional snowmobile 110, the ride for the second rider 28 on the snowmobile 10 is improved because the second rider 28 is also disposed closer to the center of gravity 46 of the snowmobile 10 (by comparison with a second rider 28 on a conventional snowmobile 110). The second seat position 54 is disposed a distance F behind the first seat position 52. According to this embodiment, distance F is between 315 mm and 365 mm. Preferably, distance F is between 325 mm and 355 mm. More preferably, distance F is between 335 mm and 345 mm. Most preferably, distance F is about 340 mm. Consequently, the second seat position 54 of the second rider 28 is most preferably about 840 mm behind the center of gravity 46 of snowmobile 10 (distance D plus distance F). As illustrated in FIG. 8, the first seat position 152 on a conventional short frame snowmobile 110 is 875 mm behind the center of gravity 146 and 795 mm behind the center of gravity 146 of a conventional long frame snowmobile 110 (distance D). As the position of the second rider 28 relative to the snowmobile's center of gravity 46 is similar to a position of a first rider (driver) 26 of a conventional snowmobile 110 relative to the conventional snowmobile's center of gravity 146, the second rider 28 on the snowmobile 10 of the present invention experiences forces similar to the forces experienced by the driver 26 of a conventional snowmobile 110.

In this embodiment, the first and second seat positions 52, 54 are disposed on the seat 50, which comprises an integral seat unit. The integral seat unit 50 may be rigidly mounted to the snowmobile 10 or it may be removably mounted.

A center of gravity 70 of the combined weight of the snowmobile 10 and rider 26 is disposed behind the center of gravity 46 of the snowmobile 10 without a rider. A center of gravity 72 of the combined weight of the snowmobile 10 and two riders 26, 28 is disposed farther rearward of the center of gravity 46. The first rider 26 has a center of gravity 27, which is positioned slightly forward of the rider's 26 torso because the rider's arms and legs are in a forwardly-extending position. Similarly, the second rider 28 has a center of gravity 29.

As illustrated in FIG. 8, the centers of gravity of the riders 26, 28 of the snowmobile 10 are positioned closer to the center of gravity 46 of snowmobile 10 than in conventional snowmobiles 110. The center of gravity 27 of the first rider 26 on the snowmobile 10 is preferably between 325 mm and 375 mm behind the center of gravity 46 of the snowmobile 10, more preferably between 335 mm and 365 mm behind the center of gravity 46, even more preferably between 345 mm and 355 mm behind the center of gravity 46, and most preferably about 350 mm (distance C) behind the center of gravity 46. In contrast, the center of gravity 127 of the first rider 26 on a conventional snowmobile 110 is disposed behind the center of gravity 146 of the convention snowmobile 110 by 645 mm for long frames and 725 mm for short frames.

The center of gravity 29 of a second rider 28 on the snowmobile 10 is disposed behind the center of gravity 46 of the snowmobile 10 by a distance calculated as distance C plus distance E. This distance is preferably between 695 mm and 745 mm, more preferably between 705 mm and 735 mm, even more preferably between 715 mm and 725 mm, and most preferably about 720 mm. In contrast, the center of gravity 129 of a second rider 128 on a conventional snowmobile 110 is disposed behind the center of gravity 146 of the conventional snowmobile 110 by 1015 mm for short frames and by 1095 mm for long frames.

Figure 3:
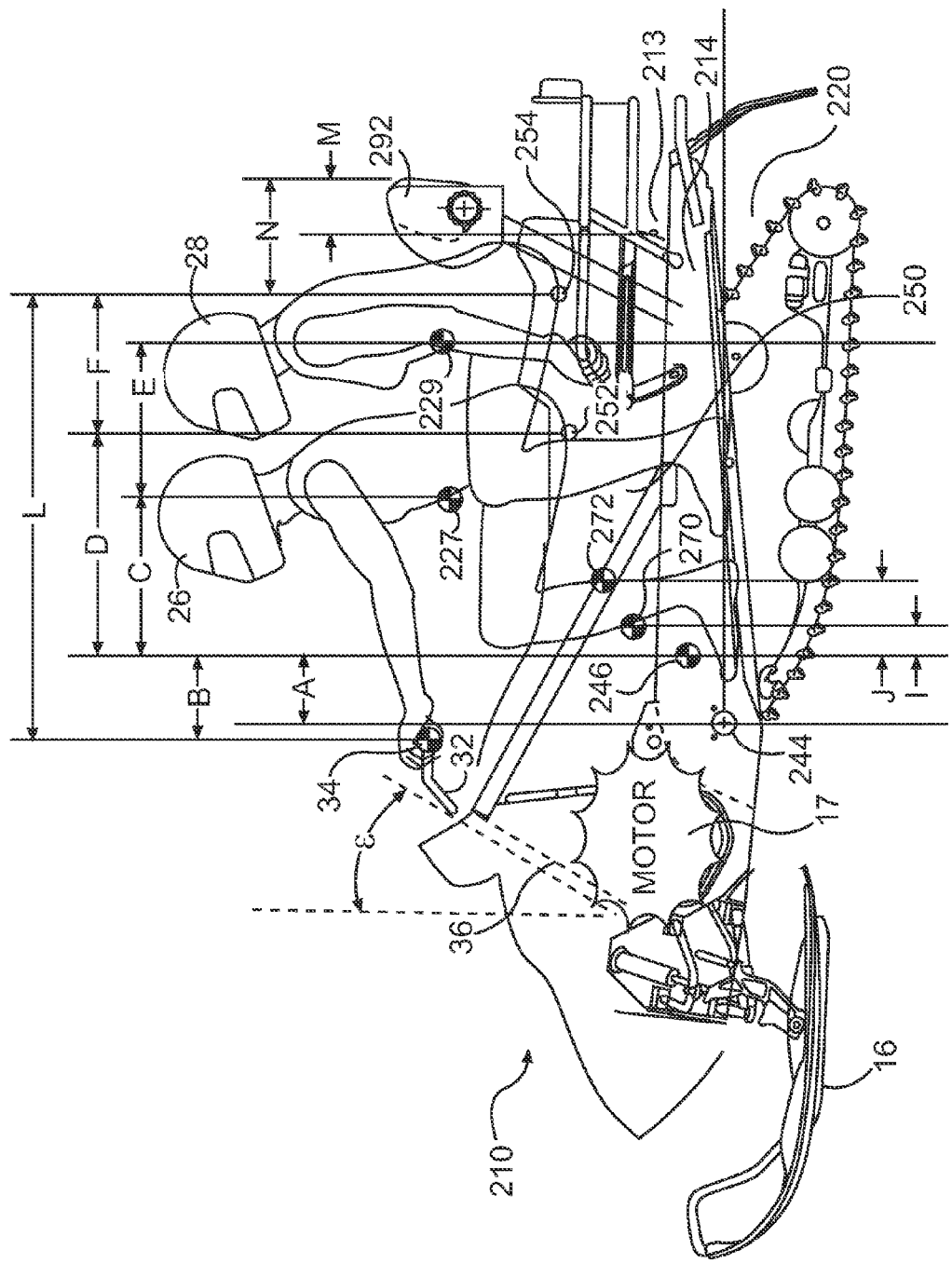
FIG. 3 is a side view illustration of a snowmobile according to a second embodiment of the present invention.

FIG. 3 illustrates a second embodiment of the present invention. The snowmobile 210 of the second embodiment has a shorter frame 214 than the frame 14 of the snowmobile 10 of the first embodiment. The frame 14 preferably has a length of about 1913 mm. The frame 214 preferably has a length of about 1493 mm. The difference in length between the long frame and the short frame is approximately 420 mm. The long frame provides for two permanent seats and a larger cargo space. In addition, the long frame is simpler and less expensive to manufacture than the short frame as it has less moving parts, and less parts in general, than the short frame. The shorter frame 214, however, provides the driver 26 with the feeling that the snowmobile is lighter and more maneuverable than a snowmobile having the long frame. The short frame also reduces the polar moment of inertial of the snowmobile about the vertical axis. The short frame also provides a tail landing for the snowmobile (i.e., the short frame provides more space for a rear idler wheel to travel higher upon compression of the rear suspension). It should be appreciated that the frame 14 and the frame 214 may have lengths that differ from the preferred embodiments discussed above.

In the second embodiment shown in FIG. 3, a 121 inch drive track 220 is illustrated instead of the 136 inch track 20 of the snowmobile 10 of the first embodiment. The short frame 214 and the 121 inch drive track 220 reduce the rotational inertia of snowmobile 210 and consequently improve its handling performance. As a result of these differences, some of the dimensions are correspondingly altered as shown in FIG. 8.

A steering shaft 36 operatively connects the skis 16 to the steering device 32. The axis of the steering shaft 36 forms an angle $\epsilon$ with vertical that is the same as the orientation described in relation to the first embodiment illustrated in FIG. 2. As in the first embodiment, the angular position of the steering shaft 36 permits placement of the steering position 34 in a position forward of that for the conventional snowmobile 110, which moves the positions of the riders 26, 28 closer to the center of gravity 246 of the snowmobile 210 and improves the comfort of the riders 26, 28.

Because the steering device 32 is shifted forward relative to conventional snowmobiles 110, the forward-most drive axle 244 is disposed behind the steering position 34 by a distance calculated as distance B minus distance A. According to the present embodiment, this distance is positive. Preferably, the distance is between 40 mm and 90 mm. More preferably, the distance is between 50 mm and 80 mm. Even more preferably, the distance is between 60 mm and 70 mm. Most preferably, the distance is about 65 mm. In contrast, the steering positions 134 on conventional snowmobiles 110 are positioned behind the forward-most drive axle 144 by 270 mm (see FIGS. 1 and 8).

A first seat position 252 is defined on the seat 250 behind the forward-most drive axle 244 by a horizontal distance calculated as distance D plus distance A. While this distance is always positive, it is preferably between 540 mm and 590 mm. More preferably, this distance is between 550 mm and 580 mm. Even more preferably, this distance is between 560 mm and 570 mm. Most preferably, this distance is about 565 mm. In contrast, the first seat position 152 in conventional snowmobiles 110 is a much larger 905 mm behind the forward-most drive axle 144 (see FIGS. 1 and 8).

A second seat position 254 is disposed a horizontal distance F behind the first seat position 252. According to this embodiment, distance F is between 315 mm and 365 mm. Preferably, distance F is between 325 mm and 355 mm. More preferably, distance F is between 335 mm and 345 mm. Most preferably, distance F is about 340 mm.

Like the seat 50 of the first embodiment, the seat 250 may comprise an integral seat unit that may either be rigidly mounted to the snowmobile 210 or may be removable. Alternatively, the seat 250 may include more than one section.

A center of gravity 270 of the combined weight of the snowmobile 210 and rider 26 is disposed behind the center of gravity 246 of the snowmobile 210 without a rider. A center of gravity 272 of the combined weight of the snowmobile 210 and two riders 26, 28 is disposed farther rearward of the center of gravity 246. The first rider 26 has a center of gravity 227, which is positioned slightly forward of the rider's 26 torso because the rider's arms and legs are in a forwardly-extending position. Similarly, the second rider 28 has a center of gravity 229.

The centers of gravity 227, 229 of the riders 26, 28, respectively, of the snowmobile 210 are positioned closer to the center of gravity 246 of snowmobile 210 than in conventional snowmobiles 110 (see distances C and E in FIG. 8). The center of gravity 227 of the first rider 26 on the snowmobile 210 is preferably between 295 mm and 345 mm behind the center of gravity 246 of the snowmobile 210, more preferably between 305 mm and 335 mm behind the center of gravity 246, even more preferably between 315 mm and 325 mm behind the center of gravity 246, and most preferably about 320 mm behind the center of gravity 246.

The center of gravity 229 of a second rider 28 on the snowmobile 210 is disposed behind the center of gravity 246 of the snowmobile 210 by a distance calculated as distance C plus distance E. This distance is preferably between 665 mm and 715 mm, more preferably between 675 mm and 705 mm, even more preferably between 685 mm and 695 mm, and most preferably about 690 mm.

Figures 4A, 4B:
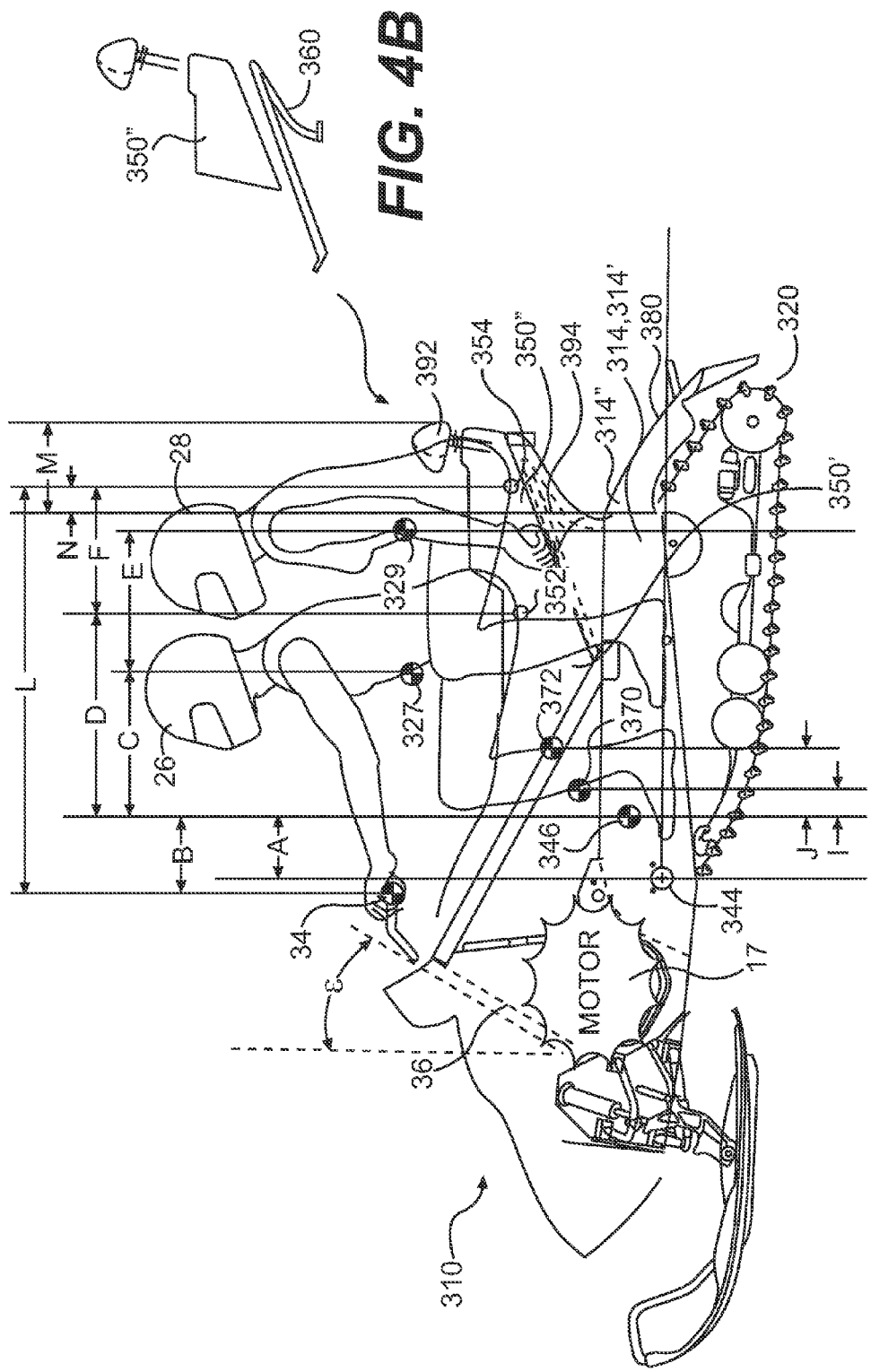
FIGS. 4A and 4B show side views of a snowmobile according to a third embodiment of the present invention.

FIGS. 4A and 4B illustrate a third embodiment of the present invention. Like the snowmobile 210 of the second embodiment, the snowmobile 310 has a short frame 314 and a 121 inch drive track 320.

As with the previous embodiments, the axis of the steering shaft 36 forms an angle $\epsilon$ with vertical that is less than 45 degrees. As in the first embodiment, the angular position of steering shaft 36 permits placement of steering position 34 in a position forward of that for the conventional snowmobile 110, which moves the positions of the riders 26, 28 closer to the center of gravity 346 of the snowmobile 310 and improves the comfort of the riders 26, 28.

The forward-most drive axle 344 is disposed behind the steering position 34 by a distance calculated as distance B minus distance A. According to the present invention, the distance is positive. Preferably, the distance is between 40 mm and 90 mm. More preferably, the distance is between 50 mm and 80 mm. Even more preferably, the distance is between 60 mm and 70 mm. Most preferably, the distance is about 65 mm. In contrast, the forward-most drive axle on conventional snowmobiles is positioned in front of the steering position by 270 mm (see FIG. 8).

The seat 350 comprises a first seat section 350' and a second seat section 350". In this embodiment, the second seat section 350" is removable. A cargo space 394, which is preferably plastic, is provided behind the first seat section 350' beneath the second removable seat section 350". As shown in FIGS. 11A through 11D, a cover 395 can be attached over the cargo space 394 to enclose the cargo space 394 when the second seat section 350" is not attached. The cover 395 is hinged to the cargo space 394. One or more latches are provided to secure the cover 395 in a closed position.

A first seat position 352 is defined on the first seat section 350' behind the forward-most drive axle 344 by a horizontal distance calculated as distance D plus distance A. According to the present invention, this distance is less than 590 mm and preferably between 540 mm and 590 mm. More preferably, this distance is between 550 mm and 580 mm. Even more preferably, this distance is between 560 mm and 570 mm. Most preferably, this distance is about 565 mm. In contrast, the first seat position 152 in conventional snowmobiles 110 is a much larger 905 mm behind the forward-most drive axle 144 (see FIGS. 1 and 8.

A second seat position 354 is defined on the second seat section 350" a horizontal distance F behind the first seat position 352. According to this embodiment, distance F is between 315 mm and 365 mm. Preferably, distance F is between 325 mm and 355 mm. More preferably, distance F is between 335 mm and 345 mm. Most preferably, distance F is about 340 mm.

A support element 360 extends upwardly and rearwardly from the frame 314. Fasteners (not shown) are used to secure the second seat 350" to the frame 314 via the support element 360. FIG. 4B shows an enlarged side view of the removable second seat section 350".

A tunnel 314' forms the back end 314" of the frame 314. The drive track 320 is mounted below the tunnel 314'. A snow flap 380 extends rearwardly behind the back end 314".

As shown in FIG. 4A, the support element 360 extends rearwardly beyond the back end 314" of the frame 314 to structurally support the second seat section 350" behind the back end 314". The second seat position 354 is disposed on the second seat section 350" a distance N behind the back end 314" of the frame 314. For this embodiment, distance N is always greater than zero. Preferably, distance N is between 55 mm and 105 mm. More preferably, distance N is between 65 mm and 95 mm. Even more preferably, distance N is between 75 mm and 85 mm. Most preferably, distance N is about 80 mm. In contrast, the second seat positions 154 of conventional snowmobiles 110 do not extend behind the back end of the frame because the second rider 28 would be prohibitively far away from the center of gravity 146 of the snowmobile 110. Conventional snowmobiles 110 position the second seat position 154 in front of the back end of the frame by 290 mm for long frames and 120 mm for short frames (see FIGS. 1 and 8).

A rearward-most end of seat section 350" is disposed a distance M behind the back end 314" of the frame 314. For this embodiment, distance M is always greater than zero. Preferably, distance M is between 205 mm and 255 mm. More preferably, distance M is between 215 mm and 245 mm. Even more preferably, distance N is between 225 mm and 235 mm. Most preferably, distance M is about 230 mm. In contrast, the rearward-most end of the seat of conventional snowmobiles 110 is disposed in front of the back end of the frame by 50 mm for long frames and at the back end of the frame for short frames (i.e., 0 mm, see FIG. 8).

A center of gravity 370 of the combined weight of the snowmobile 310 and rider 26 is disposed behind the center of gravity 346 of the snowmobile 310 without a rider. A center of gravity 372 of the combined weight of the snowmobile 310 and two riders 26, 28 is disposed farther rearward of the center of gravity 346. The first rider 26 has a center of gravity 327, which is positioned slightly forward of the rider's 26 torso because the rider's arms and legs are in a forwardly-extending position. Similarly, the second rider 28 has a center of gravity 329.

As illustrated in FIG. 8, the centers of gravity 327, 329 of the riders 26, 28 of the snowmobile 310 are positioned closer to the center of gravity 346 of snowmobile 310 than the centers of gravity 127, 129 are positioned to the center of gravity 146 in conventional snowmobiles 110. The center of gravity 327 of the first rider 26 on the snowmobile 310 is preferably between 295 mm and 345 mm behind the center of gravity 346 of the snowmobile 310, more preferably between 305 and 335 mm behind the center of gravity 346, even more preferably between 315 and 325 mm behind the center of gravity 346, and most preferably about 320 mm behind the center of gravity 346.

The center of gravity 329 of a second rider 28 on the snowmobile 310 is disposed behind the center of gravity 346 of the snowmobile 310 by a distance calculated as distance C plus distance E. This distance is preferably between 665 mm and 715 mm, more preferably between 675 mm and 705 mm, even more preferably between 685 mm and 695 mm, and most preferably about 690 mm.

Figure 5:
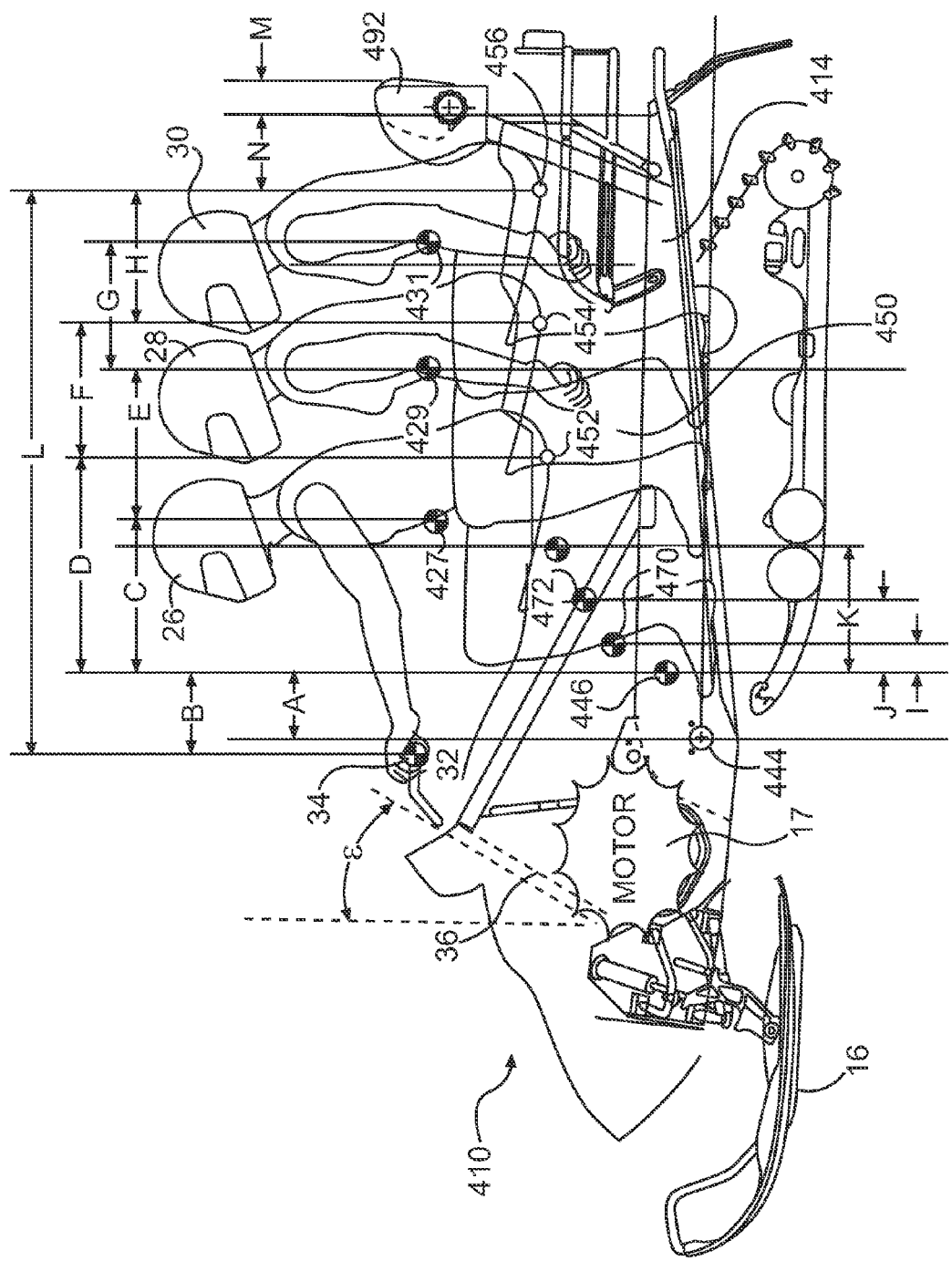
FIG. 5 is a side view illustration of a snowmobile according to a fourth embodiment of the present invention.

FIG. 5 illustrates a fourth embodiment of the present invention. Like the snowmobile 10 of the first embodiment, the snowmobile 410 has a long frame 414 and a 136 inch drive track 20.

As with the first embodiment, the axis of the steering shaft 36 forms an angle ε with vertical that is less than 45 degrees. Similarly, the angular position of steering shaft 36 permits placement of steering position 34 in a position forward of that for the conventional snowmobile 110, which moves the positions of the riders 26, 28 closer to the center of gravity 446 of the snowmobile 410 and improves the comfort of the riders 26, 28.

The forward-most drive axle 444 is disposed behind the steering position 34 by a distance calculated as distance B minus distance A. According to the present invention, the forward-most drive axle 444 is disposed behind the steering position 34. Preferably, the distance is between 40 mm and 90 mm. More preferably, the distance is between 50 mm and 80 mm. Even more preferably, the distance is between 60 mm and 70 mm. Most preferably, the distance is about 65 mm. In contrast, the steering positions 134 on conventional snowmobiles 110 are positioned behind the forward-most drive axle 144 by 270 mm (see FIGS. 1 and 8).

Like the seat 50 of the first embodiment, the seat 450 of snowmobile 410 comprises an integral seat unit that may either be rigidly mounted to the snowmobile 410 or removable. A first seat position 452 is defined on the seat 450 behind the forward-most drive axle 444 by a horizontal distance calculated as distance D plus distance A. According to the present invention, this distance is less than 590 mm and preferably between 540 mm and 590 mm. More preferably, this distance is between 550 mm and 580 mm. Even more preferably, this distance is between 560 mm and 570 mm. Most preferably, this distance is about 565 mm. In contrast, the first seat position 152 in conventional snowmobiles 110 is a much larger 905 mm behind the forward-most drive axle (see FIG. 8).

A second seat position 454 is disposed on the seat 450 a horizontal distance F behind the first seat position 452. According to this embodiment, distance F is between 315 mm and 365 mm. Preferably, distance F is between 325 mm and 355 mm. More preferably, distance F is between 335 mm and 345 mm. Most preferably, distance F is about 340 mm. Consequently, the seat position 454 of the second rider 28 is most preferably about 735 mm behind the center of gravity 446 of snowmobile 410 (distance D plus distance F).

A third seat position 456 is added behind the second seat position 454 on the seat 450 in order to accommodate a third rider 30. The forward placement of the steering position 34 permits a third rider 30 to ride the snowmobile 410 without experiencing prohibitively large jostling forces. The center of gravity 431 of the third rider 30 is positioned behind the center of gravity of snowmobile 410 by a distance calculated as distance C plus distance E plus distance G, which is preferably between 900 mm and 950 mm. The distance is more preferably between 910 mm and 940 mm. The distance is even more preferably between 920 mm and 930 mm. The distance is most preferably about 925 mm. In contrast, the second rider 28 on the conventional snowmobile 110 is positioned behind the center of gravity 146 of the conventional snowmobile 110 by 1015 mm for a long frame and 1095 mm for a short frame (distance C plus distance E). Consequently, the third rider 30 (second passenger) on snowmobile 410 is closer to the center of gravity 446 of the snowmobile 410 and experiences less jostling forces than a second rider 28 (first passenger) would normally experience on a conventional snowmobile 110.

A center of gravity 470 of the combined weight of the snowmobile 410 and rider 26 is disposed behind the center of gravity 446 of the snowmobile 410 without a rider. A center of gravity 472 of the combined weight of the snowmobile 410 and two riders 26, 28 is disposed farther rearward of the center of gravity 446 of the riderless snowmobile 410. A center of gravity 474 of the combined weight of the snowmobile 410 and three riders 26, 28, 30 is disposed even farther rearward of the center of gravity 446 of the riderless snowmobile 410. The first rider 26 has a center of gravity 427, which is positioned slightly forward of the rider's 26 torso because the rider's arms and legs are in a forwardly-extending position. Similarly, the second and third riders 28, 30 have centers of gravity 429, 431, respectively.

FIG. 8 illustrates the relevant spatial relationships for the fourth embodiment and shows that the centers of gravity of the riders 26, 28, 30 are disposed closer to the center of gravity 446 of the snowmobile than in conventional snowmobiles 110.

The center of gravity 427 of the first rider 26 on the snowmobile 410 is preferably between 220 mm and 270 mm behind the center of gravity 446 of the snowmobile 410, more preferably between 230 mm and 260 mm behind the center of gravity 446, even more preferably between 240 mm and 250 mm behind the center of gravity 446, and most preferably about 245 mm behind the center of gravity 446.

The center of gravity 429 of a second rider 28 on the snowmobile 410 is disposed behind the center of gravity 446 of the snowmobile 410 by a distance calculated as distance C plus distance E. This distance is preferably between 590 mm and 640 mm, more preferably between 600 mm and 630 mm, even more preferably between 610 mm and 620 mm, and most preferably about 615 mm.

The center of gravity 431 of the third rider 30 on the snowmobile 410 is disposed behind the center of gravity 446 of the snowmobile 410 by a distance calculated as distance C plus distance E plus distance G. This distance is preferably between 900 mm and 950 mm, more preferably between 910 mm and 940 mm, even more preferably between 920 mm and 930 mm, and most preferably about 925 mm.

A horizontal distance H between the second seat position 454 the third seat position 456 is preferably between 285 mm and 335 mm. Distance H is more preferably between 295 mm and 325 mm. Distance H is even more preferably between 305 mm and 315 mm. Distance H is most preferably about 310 mm. A horizontal distance G between the center of gravity 429 of the second rider 428 and the center of gravity 431 of the third rider 430 is about the same as distance H for this embodiment (see FIG. 8).

Figure 6:
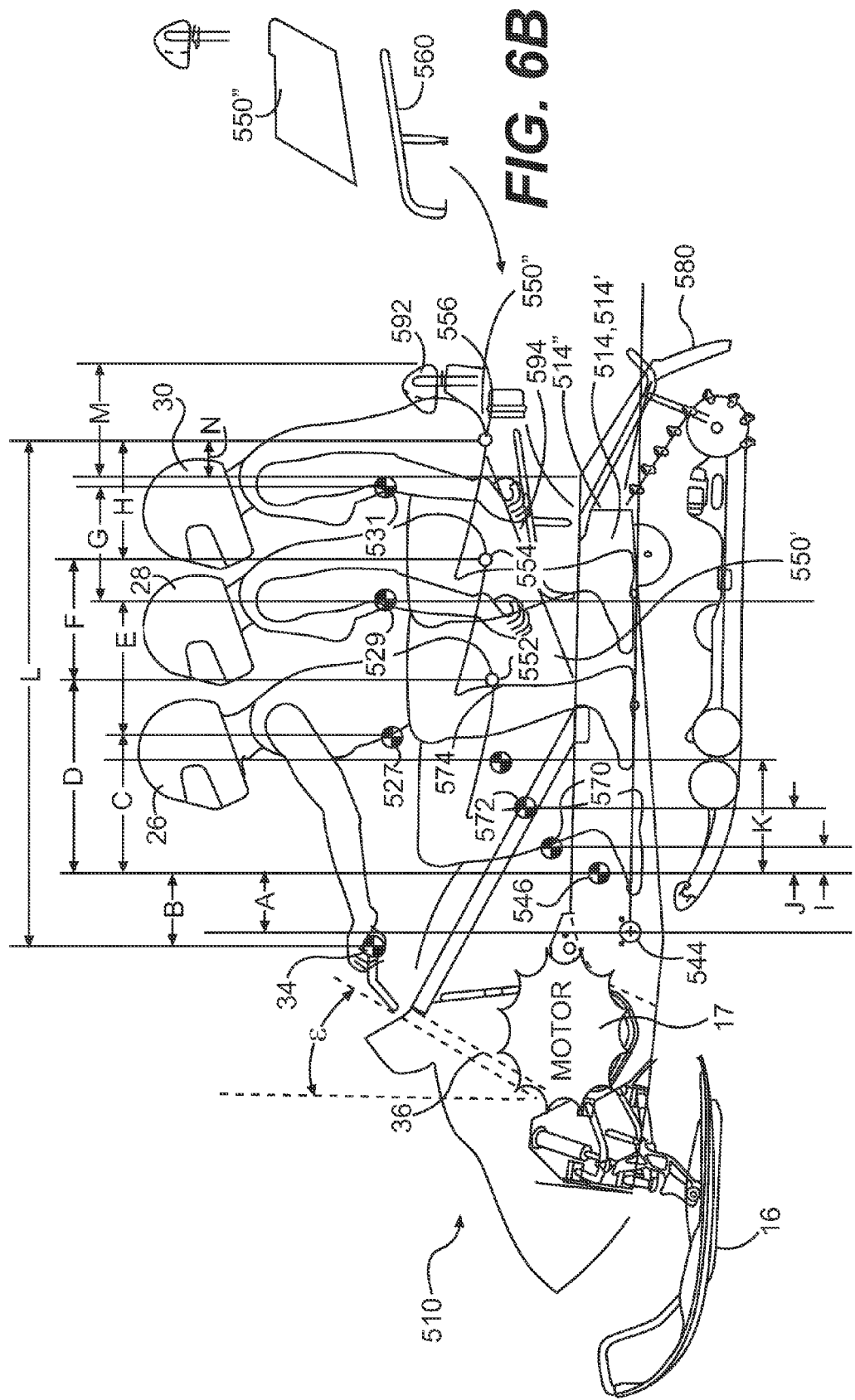
FIGS. 6A and 6B show side view illustrations of a snowmobile according to a fifth embodiment of the present invention.

FIGS. 6A and 6B illustrate a fifth embodiment of the present invention. Like the snowmobile 10 of the first embodiment, snowmobile 510 has a long frame 514 and a 136 inch drive track 520. As in previous embodiments, the axis of the steering shaft 36 forms an angle ϵ with vertical that is less than 45 degrees. The forward-most drive axle 544 is disposed behind the steering position 34 by a distance calculated as distance B minus distance A. According to this embodiment, the forward-most drive axle 544 is disposed behind the steering position 34. Preferably, the distance is between 40 mm and 90 mm. More preferably, the distance is between 50 mm and 80 mm. Even more preferably, the distance is between 60 mm and 70 mm. Most preferably, the distance is about 65 mm.

Similar to the seat 350 of the snowmobile 310 of the third embodiment, seat 550 is formed by a first seat section 550' and a second seat section 550". The second seat section 550" is removable. When the second seat section 550" is removed, a cover 395 (as illustrated in FIGS. 11A–D and discussed with respect to the third embodiment) may be used to cover a cargo space 594 that is located beneath the second seat section 550" and behind the first seat section 550'.

A first seat position 552 is defined on the first seat section 550' behind the forward-most drive axle 544 by a horizontal distance calculated as distance D plus distance A. According to the present invention, this distance is less than 590 mm and preferably between 540 mm and 590 mm. More preferably, this distance is between 550 mm and 580 mm. Even more preferably, this distance is between 560 mm and 570 mm. Most preferably, this distance is about 565 mm.

A second seat position 554 is disposed on the first seat section 550' a horizontal distance F behind the first seat position 552. According to this embodiment, distance F is between 265 mm and 315 mm. Preferably, distance F is between 275 mm and 305 mm. More preferably, distance F is between 285 mm and 295 mm. Most preferably, distance F is about 290 mm.

A third seat position 556 is positioned on the second seat section 550" behind the second seat position 554 by a horizontal distance H, which is preferably between 320 mm and 370 mm. Distance H is more preferably between 330 mm and 360 mm. Distance H is even more preferably between 340 mm and 350 mm. Distance H is most preferably about 345 mm.

A tunnel 514' forms the back end 514" of the frame 514. The drive track 520 is mounted below the tunnel 514'. A snow flap 580 extends rearwardly behind the back end 514".

As in the third embodiment, a support element 560 extends upwardly and rearwardly from the back end 514" of the frame 514 to provide support for the second seat section 550". The third seat position 556 and back end of the third seat position 556 extend behind the back end 514" of the frame 514 by distances N and M, respectively. Distance N is always positive and preferably between 35 mm and 85 mm. Distance N is more preferably between 45 mm and 75 mm. Distance N is even more preferably between 55 mm and 65 mm. Distance N is most preferably about 60 mm. Distance M is always positive and preferably between 265 mm and 315 mm. Distance M is more preferably between 275 mm and 305 mm. Distance M is even more preferably between 285 mm and 295 mm. Distance M is most preferably about 290 mm.

A center of gravity 570 of the combined weight of the snowmobile 410 and rider 26 is disposed behind the center of gravity 546 of the snowmobile 510 without a rider. A center of gravity 572 of the combined weight of the snowmobile 510 and two riders 26, 28 is disposed farther rearward of the center of gravity 546 of the riderless snowmobile 510. A center of gravity 574 of the combined weight of the snowmobile 510 and three riders 26, 28, 30 is disposed even farther rearward of the center of gravity 546 of the riderless snowmobile 410. The first rider 26 has a center of gravity 527, which is positioned slightly forward of the rider's 26 torso because the rider's arms and legs are in a forwardly-extending position. Similarly, the second and third riders 28, 30 have centers of gravity 529, 531, respectively.

FIG. 8 illustrates the relevant spatial relationships for the fifth embodiment and illustrates that the centers of gravity of the riders 26, 28, 30 are disposed closer to the center of gravity 546 of the snowmobile 510 than in the conventional snowmobiles 110.

The center of gravity 527 of the first rider 26 on the snowmobile 510 is preferably between 220 mm and 270 mm behind the center of gravity 546 of the snowmobile 510, more preferably between 230 mm and 260 mm behind the center of gravity 546, even more preferably between 240 mm and 250 mm behind the center of gravity 546, and most preferably about 245 mm behind the center of gravity 546.

The center of gravity 529 of a second rider 28 on the snowmobile 510 is disposed behind the center of gravity 546 of the snowmobile 510 by a distance calculated as distance C plus distance E. This distance is preferably between 590 mm and 640 mm, more preferably between 600 mm and 630 mm, even more preferably between 610 mm and 620 mm, and most preferably about 615 mm.

The center of gravity 531 of the third rider 30 on the snowmobile 510 is disposed behind the center of gravity 546 of the snowmobile 510 by a distance calculated as distance C plus distance E plus distance G. This distance is preferably between 935 mm and 985 mm, more preferably between 945 mm and 975 mm, even more preferably between 955 mm and 965 mm, and most preferably about 960 mm.

It should be noted that while the third and fifth embodiments include a removable back seat that simply attaches to the support element 360, 560, other ways of creating a removable seat section, which are known by those of ordinary skill in the art, are also intended to be included in the invention. For example, a second seat section might be slidable along a longitudinal track such that a third seat could be inserted like a leaf of a table between the first and second seats. Similarly, a backrest might be slidably mounted to a longitudinal track behind a first seat and permit the insertion of second and/or third seats between the first seat and the backrest.

Furthermore, while the third and fifth embodiments illustrate particular embodiments of the second seat sections 350, 550 and support pieces 360, 560, numerous other embodiments of such components, which would be apparent to those skilled in the art, could also be utilized and are intended to be included in the present invention. For example, FIGS. 12A through 12E illustrate several alternative seats having first seat sections 650', 750', 850', 950', 1050', second seat sections 650", 750", 850", 950", 1050", and support pieces 660, 760, 860, 960, 1060.

Figure 7:
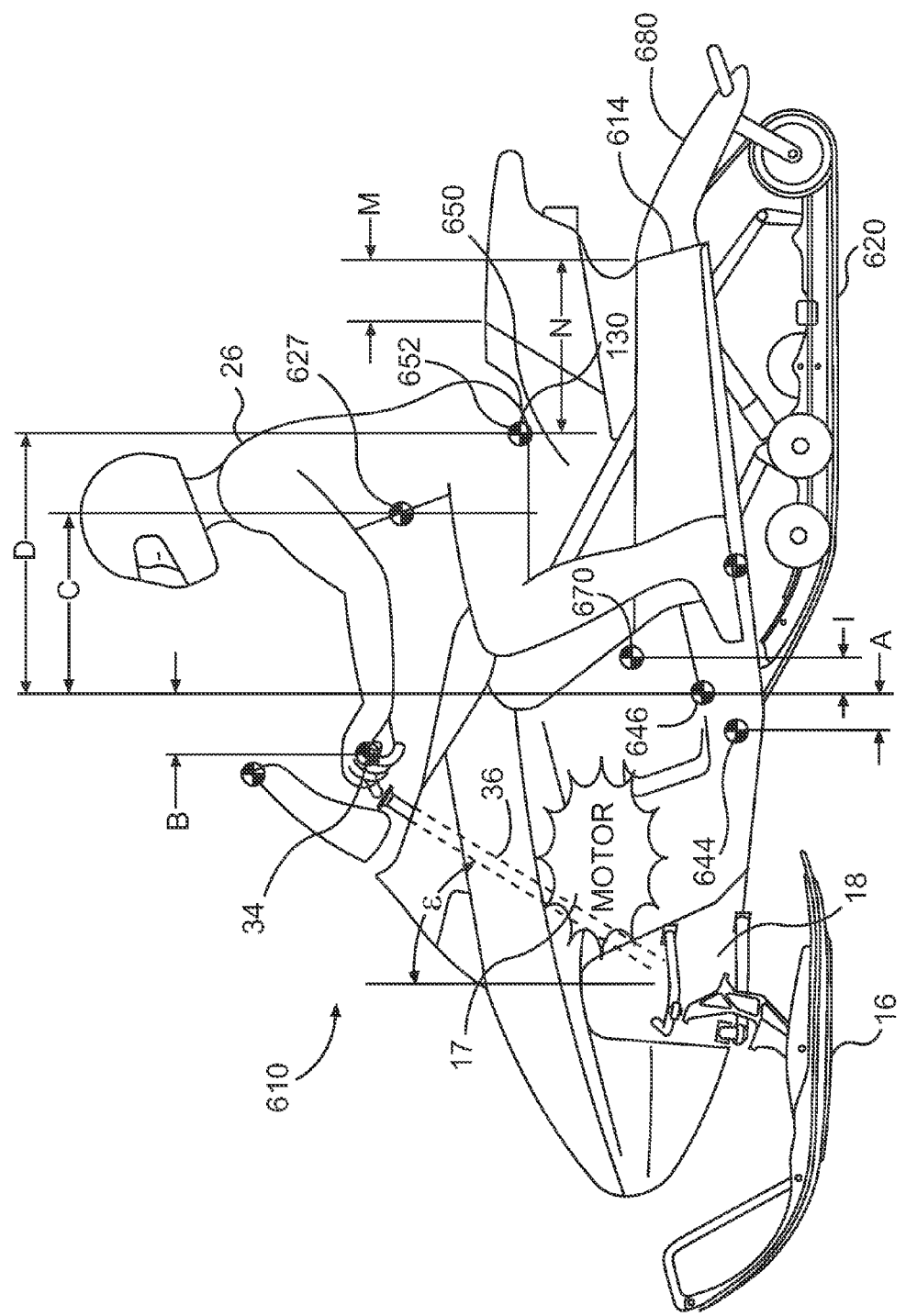
FIG. 7 is a side view illustration of a snowmobile according to a sixth embodiment of the present invention.

FIG. 7 illustrates a sixth embodiment of the snowmobile 610. The snowmobile 610 of the sixth embodiment may have a short or long frame 614 and a snow flap 680 extending from the back end of the frame 614. The snowmobile 610 has a 136 inch drive track 620.

As with the previous embodiments, the axis of the steering shaft 36 forms an angle $\epsilon$ with vertical that is less than 45 degrees. As in the first embodiment, the angular position of steering shaft 36 permits placement of steering position 34 in a position forward of that for the conventional snowmobile 110, which moves the position of the driver 26 closer to the center of gravity 646 of the snowmobile 610 and improves the comfort of the driver 26.

The forward-most drive axle 644 is disposed behind the steering position 34 by a distance calculated as distance B minus distance A. According to the present invention, the distance is positive. Preferably, the distance is between 40 mm and 90 mm. More preferably, the distance is between 50 mm and 80 mm. Even more preferably, the distance is between 60 mm and 70 mm. Most preferably, the distance is about 65 mm. In contrast, the forward-most drive axle 144 on conventional snowmobiles 110 is positioned in front of the steering position 134 by 270 mm (see FIG. 8).

The snowmobile 610 has a seat 650 configured for a single rider 26 (1-up rider positioning) that defines a seat position 652. The seat position 652 is behind the forward-most drive axle 644 by a horizontal distance calculated as distance D plus distance A. According to the present invention, this distance is less than 590 mm and preferably between 540 mm and 590 mm. More preferably, this distance is between 550 mm and 580 mm. Even more preferably, this distance is between 560 mm and 570 mm. Most preferably, this distance is about 565 mm. In contrast, the first seat position 152 in conventional snowmobiles 110 is a much larger 905 mm behind the forward-most drive axle 144 (see FIGS. 1 and 8).

As illustrated in FIG. 7, the center of gravity 627 of the rider 26 of the snowmobile 610 is positioned closer to the center of gravity 646 of the snowmobile 610 than in conventional snowmobiles 110. The center of gravity 627 of the rider 26 on the snowmobile 610 is preferably between 295 mm and 345 mm behind the center of gravity 646 of the snowmobile 610, more preferably between 305 mm and 335 mm behind the center of gravity 646, even more preferably between 315 mm and 325 mm behind the center of gravity 646, and most preferably about 320 mm behind the center of gravity 646.

While the invention has been described with reference to the various exemplary embodiments outlined above, it will be understood by those skilled in the art that various changes may be made and equivalents may be substituted for elements thereof without departing from the spirit and scope of the present invention. In addition, many modifications may be made to adapt a particular situation, component, or material to the teachings of the present invention without departing from its teachings as claimed.

What is claimed is:

1. A snowmobile, comprising:
a frame;
a straddle-type seat disposed on the frame;
first and second seat positions defined by the seat;
an engine disposed on the frame in front of the seat;
a drive track disposed below the frame and connected operatively to the engine for propulsion of the snowmobile;
a forward-most drive track axle disposed on the frame;
two skis disposed on the frame;
a steering device having a steering position; and
a steering shaft operatively connecting the two skis to the steering device for steering the snowmobile, wherein the steering shaft is disposed over the engine at an angle $\epsilon$ of less than 45° from vertical, the first seat position is disposed less than 590 mm behind the forward-most drive track axle, the second seat position is disposed behind the first seat position by between 265 mm and 365 mm, and the steering position is disposed forward of the forward-most drive track axle.

2. The snowmobile of claim 1, wherein angle $\epsilon$ is between 25° and 40° from vertical.

3. The snowmobile of claim 2, wherein angle $\epsilon$ is between 30° and 35° from vertical.

4. The snowmobile of claim 3, wherein angle $\epsilon$ is 33° from vertical.

5. The snowmobile of claim 1, wherein the first seat position is disposed between 550 mm and 580 mm behind the forward-most drive track axle.

6. The snowmobile of claim 5, wherein the first seat position is disposed between 560 mm and 570 mm behind the forward-most drive track axle.

7. The snowmobile of claim 6, wherein the first seat position is disposed about 565 mm behind the forward-most drive track axle.

8. The snowmobile of claim 1, wherein the second seat position is disposed behind the first seat position by between 325 mm and 355 mm.

9. The snowmobile of claim 8, wherein the second seat position is disposed behind the first seat position by between 335 mm and 345 mm.

10. The snowmobile of claim 9, wherein the second seat position is disposed behind the first seat position by about 340 mm.

11. The snowmobile of claim 1, wherein the second seat position is disposed behind the first seat position by between 275 mm and 305 mm.

12. The snowmobile of claim 11, wherein the second seat position is disposed behind the first seat position by between 285 mm and 295 mm.

13. The snowmobile of claim 12, wherein the second seat position is disposed behind the first seat position by about 290 mm.

14. The snowmobile of claim 1 further comprising a third seat position on the seat, wherein the third seat position is disposed behind the second seat position by between 285 mm and 370 mm.

15. The snowmobile of claim 14, wherein the third seat position is disposed behind the second seat position by between 295 mm and 325 mm.

16. The snowmobile of claim 15, wherein the third seat position is disposed behind the second seat position by between 305 and 315 mm.

17. The snowmobile of claim 16, wherein the third seat position is disposed behind the second seat position by about 310 mm.

18. The snowmobile of claim 14, wherein the third seat position is disposed behind the second seat position by between 330 mm and 360 mm.

19. The snowmobile of claim 18, wherein the third seat position is disposed behind the second seat position by between 340 mm and 350 mm.

20. The snowmobile of claim 19, wherein the third seat position is disposed behind the second seat position by about 345 mm.

21. The snowmobile of claim 1, wherein the first and second seat positions are disposed on a singular seat unit.

22. The snowmobile of claim 1, wherein the seat comprises first and second seat sections, the second seat section being removable, the first seat position being on the first seat section, and the second seat position being on the second seat section.

23. The snowmobile of claim 22, wherein a cargo space is provided behind the first seat section beneath the second removable seat section.

24. The snowmobile of claim 14, wherein the first, second, and third seat positions are disposed on a singular seat unit.

25. The snowmobile of claim 14, wherein the seat comprises first and second seat sections, the second seat section being removable, the first and second seat positions being on the first seat section, and the third seat position being on the second seat section.

26. The snowmobile of claim 1, further comprising a front suspension system operatively connecting the two skis to the frame, wherein the front suspension system is one of an A-arm suspension system and a trailing arm suspension system.

27. A snowmobile, comprising:
a frame;
a straddle-type seat disposed on the frame;
first and second seat positions defined by the seat;
an engine disposed on the frame in front of the seat;
a drive track disposed below the frame and connected operatively to the engine for propulsion of the snowmobile;
a forward-most drive track axle disposed on the frame;
a steering device having a steering position;
two skis disposed on the frame and operatively connected to the steering device; and
a steering shaft operatively connecting the two skis to the steering device for steering the snowmobile, wherein the steering position is disposed forward of the forward-most drive track axle, a horizontal distance between the forward-most drive track axle and the first seat position is less than 590 mm, and the second seat position is disposed behind the first seat position by between 265 mm and 365 mm.

28. The snowmobile of claim 27, wherein the second seat position is disposed behind the first seat position by between 325 mm and 355 mm.

29. The snowmobile of claim 28, wherein the second seat position is disposed behind the first seat position by between 335 mm and 345 mm.

30. The snowmobile of claim 29, wherein the second seat position is disposed behind the first seat position by about 340 mm.

31. The snowmobile of claim 27, wherein the second seat position is disposed behind the first seat position by between 275 mm and 305 mm.

32. The snowmobile of claim 31, wherein the second seat position is disposed behind the first seat position by between 285 mm and 295 mm.

33. The snowmobile of claim 32, wherein the second seat position is disposed behind the first seat position by about 290 mm.

34. The snowmobile of claim 27, wherein the steering position is disposed forward of the forward-most drive track axle by between 40 mm and 90 mm.

35. The snowmobile of claim 34, wherein the steering position is disposed forward of the forward-most drive track axle by between 50 mm and 80 mm.

36. The snowmobile of claim 35, wherein the steering position is disposed forward of the forward-most drive track axle by between 60 mm and 70 mm.

37. The snowmobile of claim 36, wherein the steering position is disposed forward of the forward-most drive track axle by about 65 mm.

38. The snowmobile of claim 27, wherein the horizontal distance between the forward-most drive track axle and the first seat position is between 550 mm and 580 mm.

39. The snowmobile of claim 38, wherein the horizontal distance between the forward-most drive track axle and the first seat position is between 560 mm and 570 mm.

40. The snowmobile of claim 39, wherein the horizontal distance between the forward-most drive track axle and the first seat position is about 565 mm.

41. The snowmobile of claim 27, further comprising a third seat position on the seat, wherein the third seat position is disposed behind the second seat position by between 285 mm and 370 mm.

42. The snowmobile of claim 41, wherein the third seat position is disposed behind the second seat position by between 295 mm and 325 mm.

43. The snowmobile of claim 42, wherein the third seat position is disposed behind the second seat position by between 305 and 315 mm.

44. The snowmobile of claim 43, wherein the third seat position is disposed behind the second seat position by about 310 mm.

45. The snowmobile of claim 41, wherein the third seat position is disposed behind the second seat position by between 330 mm and 360 mm.

46. The snowmobile of claim 45, wherein the third seat position is disposed behind the second seat position by between 340 mm and 350 mm.

47. The snowmobile of claim 46, wherein the third seat position is disposed behind the second seat position by about 345 mm.

48. The snowmobile of claim 27, wherein the first and second seat positions are disposed on a singular seat unit.

49. The snowmobile of claim 27, wherein the seat comprises first and second seat sections, the second seat section being removable, the first seat position being on the first seat section, and the second seat position being on the second seat section.

50. The snowmobile of claim 49, wherein a cargo space is provided behind the first seat section beneath the second removable seat section.

51. The snowmobile of claim 41, wherein the first, second, and third seat positions are disposed on a singular seat unit.

52. The snowmobile of claim 41, wherein the seat comprises first and second seat sections, the second seat section being removable, the first and second seat positions being on the first seat section, and the third seat position being on the second seat section.

53. The snowmobile of claim 27, further comprising a front suspension system operatively connecting the two skis to the frame, wherein the front suspension system is one of an A-arm suspension system and a trailing arm suspension system.

54. A snowmobile, comprising:
a frame including a tunnel;
an engine disposed on the frame;
a drive track disposed below the tunnel and connected operatively to the engine for propulsion of the snowmobile;
a forward-most drive track axle disposed on the frame;
two skis disposed on the frame;
a steering device disposed on the frame and operatively connected to the two skis for steering the snowmobile, the steering device having a steering position;
a steering shaft operatively connecting the two skis to the steering device for steering the snowmobile; and
a straddle-type seat disposed on the frame, wherein a back end of the seat extends behind a rearward-most portion of the frame and the steering position is disposed forward of the forward-most drive track axle; and
a front suspension system operatively connecting the two skis to the frame, wherein the front suspension system is one of an A-arm suspension system and a trailing arm suspension system.

55. The snowmobile of claim 54, wherein the back end of the seat extends behind the rearward-most portion of the frame by between 205 mm and 255 mm.

56. The snowmobile of claim 55, wherein the back end of the seat extends behind the rearward-most portion of the frame by between 215 mm and 245 mm.

57. The snowmobile of claim 56, wherein the back end of the seat extends behind the rearward-most portion of the frame by between 225 mm and 235 mm.

58. The snowmobile of claim 57, wherein the back end of the seat extends behind the rearward-most portion of the frame by about 230 mm.

59. The snowmobile of claim 54, wherein the back end of the seat extends behind the rearward-most portion of the frame by between 35 mm and 85 mm.

60. The snowmobile of claim 59, wherein the back end of the seat extends behind the rearward-most portion of the frame by between 45 mm and 75 mm.

61. The snowmobile of claim 60, wherein the back end of the seat extends behind the rearward-most portion of the frame by between 55 mm and 65 mm.

62. The snowmobile of claim 61, wherein the back end of the seat extends behind the rearward-most portion of the frame by about 60 mm.

63. The snowmobile of claim 54, wherein the back end of the seat extends behind the rearward-most portion of the frame by between 265 mm and 315 mm.

64. The snowmobile of claim 63, wherein the back end of the seat extends behind the rearward-most portion of the frame by between 275 mm and 305 mm.

65. The snowmobile of claim 64, wherein the back end of the seat extends behind the rearward-most portion of the frame by between 285 mm and 295 mm.

66. The snowmobile of claim 65, wherein the back end of the seat extends behind the rearward-most portion of the frame by about 290 mm.

67. The snowmobile of claim 54, further comprising a support member attached to the frame that extends upwardly and rearwardly from the frame to provide structural support for the seat behind the back end of the frame.

68. The snowmobile of claim 67, wherein the seat comprises first and second seat sections, the second seat section being removable.

69. A snowmobile, comprising:
a frame having a tunnel;
an engine disposed on the frame;
a drive track disposed below the tunnel and connected operatively to the engine for propulsion of the snowmobile;
a forward-most drive track axle disposed on the frame;
two skis disposed on the frame;
a steering device disposed on the frame and operatively connected to the two skis for steering the snowmobile, the steering device having a steering position;
a steering shaft operatively connecting the two skis to the steering device for steering the snowmobile;
a straddle-type seat disposed on the frame behind the steering device; and
a seat position disposed on the seat, wherein the seat position is disposed behind a rearward-most portion of the frame and the steering position is disposed forward of the forward-most drive track axle.

70. The snowmobile of claim 69, wherein the seat position is disposed behind the rearward-most portion of the frame by between 35 and 85 mm.

71. The snowmobile of claim 70, wherein the seat position is disposed behind the rearward-most portion of the frame by between 45 and 75 mm.

72. The snowmobile of claim 71, wherein the seat position is disposed behind the rearward-most portion of the frame by between 55 and 65 mm.

73. The snowmobile of claim 72, wherein the seat position is disposed behind the rearward-most portion of the frame by about 60 mm.

74. The snowmobile of claim 69, wherein the seat position is disposed behind the rearward-most portion of the frame by between 55 mm and 105 mm.

75. The snowmobile of claim 74, wherein the seat position is disposed behind the rearward-most portion of the frame by between 65 and 95 mm.

76. The snowmobile of claim 75, wherein the seat position is disposed behind the rearward-most portion of the frame by between 75 and 85 mm.

77. The snowmobile of claim 76, wherein the seat position is disposed behind the rearward-most portion of the frame by about 80 mm.

78. The snowmobile of claim 69, wherein the seat comprises first and second seat sections, the second seat section being behind the first seat section, the second seat section being removable, and the seat position being on the second seat section.

79. The snowmobile of claim 69, further comprising a front suspension system operatively connecting the two skis to the frame, wherein the front suspension system is one of an A-arm suspension system and a trailing arm suspension system.

80. A snowmobile, comprising:
a frame;
a straddle-type seat disposed on the frame;
a seat position defined by the seat;

an engine disposed on the frame in front of the seat;
a drive track disposed below the frame and connected operatively to the engine for propulsion of the snowmobile;
a forward-most drive track axle disposed on the frame;
two skis disposed on the frame;
a steering device having a steering position; and
a steering shaft operatively connecting the two skis to the steering device for steering the snowmobile, wherein the steering shaft is disposed over the engine at an angle ϵ of less than 45° from vertical, the steering position is disposed forward of the forward-most drive track axle and the seat position is disposed less than 590 mm behind the forward-most drive track axle.

81. The snowmobile of claim 80, wherein the angle ϵ is between 25° and 40° from vertical.

82. The snowmobile of claim 81, wherein the angle ϵ is between 30° and 35° from vertical.

83. The snowmobile of claim 82, wherein the angle ϵ is 33° from vertical.

84. The snowmobile of claim 80, wherein the seat position is disposed behind the forward-most drive track axle by between 550 mm and 580 mm.

85. The snowmobile of claim 84, wherein the seat position is disposed behind the forward-most drive track axle by between 560 mm and 570 mm.

86. The snowmobile of claim 85, wherein the seat position is disposed behind the forward-most drive track axle by about 565 mm.

87. The snowmobile of claim 80, further comprising a front suspension system operatively connecting the two skis to the frame, wherein the front suspension system is one of an A-arm suspension system and a trailing arm suspension system.

88. A snowmobile, comprising:
a frame;
a straddle-type seat disposed on the frame;
a seat position defined by the seat;
an engine disposed on the frame in front of the seat;
a drive track disposed below the frame and connected operatively to the engine for propulsion of the snowmobile;
a forward-most drive track axle disposed on the frame;
two skis disposed on the frame;
a steering device having a steering position; and
a steering shaft operatively connecting the two skis to the steering device for steering the snowmobile, wherein the steering shaft is disposed over the engine at an angle ϵ of less than 45° from vertical and the steering position is disposed forward of the forward-most drive track axle.

89. The snowmobile of claim 88, wherein the angle ϵ is between 25° and 40° from vertical.

90. The snowmobile of claim 89, wherein the angle ϵ is between 30° and 35° from vertical.

91. The snowmobile of claim 90, wherein the angle ϵ is 33° from vertical.

92. The snowmobile of claim 88, wherein the steering position is disposed forward of the forward-most drive track axle by between 40 mm and 90 mm.

93. The snowmobile of claim 92, wherein the steering position is disposed forward of the forward-most drive track axle by between 50 mm and 80 mm.

94. The snowmobile of claim 93, wherein the steering position is disposed forward of the forward-most drive track axle by between 60 mm and 70 mm.

95. The snowmobile of claim 94, wherein the steering position is disposed forward of the forward-most drive track axle by about 65 mm.

96. The snowmobile of claim 88, further comprising a front suspension system operatively connecting the two skis to the frame, wherein the front suspension system is one of an A-arm suspension system and a trailing arm suspension system.

97. A snowmobile, comprising:
a frame;
a straddle-type seat disposed on the frame;
a seat position defined by the seat;
an engine disposed on the frame in front of the seat;
a drive track disposed below the frame and connected operatively to the engine for propulsion of the snowmobile;
a forward-most drive track axle disposed on the frame;
two skis disposed on the frame;
a steering device having a steering position; and
a steering shaft operatively connecting the two skis to the steering device for steering the snowmobile, wherein the seat position is disposed less than 590 mm behind the forward-most drive track axle and the steering position is disposed forward of the forward-most drive track axle.

98. The snowmobile of claim 97, wherein the seat position is disposed between 550 mm and 580 mm behind the forward-most drive track axle.

99. The snowmobile of claim 98, wherein the seat position is disposed between 560 mm and 570 mm behind the forward-most drive track axle.

100. The snowmobile of claim 99, wherein the seat position is disposed about 565 mm behind the forward-most drive track axle.

101. The snowmobile of claim 97, wherein the steering position is disposed forward of the forward-most drive track axle by between 40 mm and 90 mm.

102. The snowmobile of claim 101, wherein the steering position is disposed forward of the forward-most drive track axle by between 50 mm and 80 mm.

103. The snowmobile of claim 102, wherein the steering position is disposed forward of the forward-most drive track axle by between 60 mm and 70 mm.

104. The snowmobile of claim 103, wherein the steering position is disposed forward of the forward-most drive track axle by about 65 mm.

105. The snowmobile of claim 97, further comprising a front suspension system operatively connecting the two skis to the frame, wherein the front suspension system is one of an A-arm suspension system and a trailing arm suspension system.

106. A snowmobile, comprising:
a frame;
a straddle-type seat disposed on the frame;
a seat position defined by the seat;
an engine disposed on the frame in front of the seat;
a drive track disposed below the frame and connected operatively to the engine for propulsion of the snowmobile;
a forward-most drive track axle disposed on the frame:
two skis disposed on the frame;
a steering device having a steering position; and
a steering shaft operatively connecting the two skis to the steering device for steering the snowmobile, wherein the seat position is disposed less than 590 mm behind the forward-most drive track axle, the steering position is disposed forward of the forward-most drive track axle and the frame is between about 1493 mm and 1913 mm long.

107. The snowmobile of claim 106, wherein the seat position is disposed between 550 mm and 580 mm behind the forward-most drive track axle.

108. The snowmobile of claim 107, wherein the seat position is disposed between 560 mm and 570 mm behind the forward-most drive track axle.

109. The snowmobile of claim 108, wherein the seat position is disposed about 565 mm behind the forward-most drive track axle.

110. The snowmobile of claim 106, further comprising:
a front suspension system operatively connecting the two skis to the frame, wherein the front suspension system is one of an A-arm suspension system and a trailing arm suspension system.

111. A snowmobile, comprising:
a frame;
a straddle-type seat disposed on the frame;
a seat position defined by the seat;
an engine disposed on the frame in front of the seat;
a drive track disposed below the frame and connected operatively to the engine for propulsion of the snowmobile;
a forward-most drive track axle disposed on the frame;
two skis disposed on the frame;
a steering device having a steering position; and
a steering shaft operatively connecting the two skis to the steering device for steering the snowmobile, wherein the steering position is disposed forward of the forward-most drive track axle and the frame is between about 1493 mm and 1913 mm long; and
a front suspension system operatively connecting the two skis to the frame, wherein the front suspension system is one of an A-arm suspension system and a trailing arm suspension system.

112. The snowmobile of claim 111, wherein the steering position is disposed forward of the forward-most drive track axle by between 40 mm and 90 mm.

113. The snowmobile of claim 112, wherein the steering position is disposed forward of the forward-most drive track axle by between 50 mm and 80 mm.

114. The snowmobile of claim 113, wherein the steering position is disposed forward of the forward-most drive track axle by between 60 mm and 70 mm.

115. The snowmobile of claim 114, wherein the steering position is disposed forward of the forward-most drive track axle by about 65 mm.

116. A snowmobile, comprising:
a frame;
a straddle-type seat disposed on the frame;
an engine disposed on the frame in front of the seat;
a drive track disposed below the frame and connected operatively to the engine for propulsion of the snowmobile;
a forward-most drive track axle disposed on the frame;
two skis disposed on the frame;
a steering device having a steering position; and
a steering shaft operatively connecting the two skis to the steering device for steering the snowmobile, wherein the steering position is disposed forward of the forward-most drive track axle; and
a front suspension system operatively connecting the two skis to the frame, wherein the front suspension system is one of an A-arm suspension system and a trailing arm suspension system.

117. The snowmobile of claim 116, wherein the steering position is disposed forward of the forward-most drive track axle by between 50 mm and 80 mm.

118. The snowmobile of claim 117, wherein the steering position is disposed forward of the forward-most drive track axle by between 60 mm and 70 mm.

119. The snowmobile of claim 118, wherein the steering position is disposed forward of the forward-most drive track axle by about 65 mm.

120. The snowmobile of claim 116, wherein the steering shaft is disposed over the engine at an angle $\epsilon$ of less than 45° from vertical.

121. The snowmobile of claim 120, wherein the angle $\epsilon$ is between 25° and 40° from vertical.

122. The snowmobile of claim 121, wherein the angle $\epsilon$ is between 30° and 35° from vertical.

123. The snowmobile of claim 122, wherein the angle $\epsilon$ is 33° from vertical.

124. The snowmobile of claim 116, further comprising a seat position defined by the seat, wherein the seat position is disposed less than 590 mm behind the forward-most drive track axle.

125. The snowmobile of claim 124, wherein seat position is disposed between 550 mm and 580 mm behind the forward-most drive track axle.

126. The snowmobile of claim 125, wherein the seat position is disposed between 560 mm and 570 mm behind the forward-most drive track axle.

127. The snowmobile of claim 126, wherein the seat position is disposed about 565 mm behind the forward-most drive track axle.

* * * * *